(12) United States Patent
Dooling

(10) Patent No.: US 11,292,541 B2
(45) Date of Patent: Apr. 5, 2022

(54) SELECTIVELY OPENABLE/CLOSABLE MOTORCYCLE BAG

(71) Applicant: Daniel J. Dooling, Fenton, MI (US)

(72) Inventor: Daniel J. Dooling, Fenton, MI (US)

(73) Assignee: Load Lugger, LLC, Holly, MI (US)

( * ) Notice: Subject to any disclaimer, the term of this patent is extended or adjusted under 35 U.S.C. 154(b) by 590 days.

(21) Appl. No.: 16/176,773

(22) Filed: Oct. 31, 2018

(65) Prior Publication Data

US 2020/0130765 A1   Apr. 30, 2020

(51) Int. Cl.
  *B62J 19/00*    (2006.01)
  *B60J 11/00*    (2006.01)

(52) U.S. Cl.
  CPC ............... *B62J 19/00* (2013.01); *B60J 11/00* (2013.01)

(58) Field of Classification Search
  CPC .................................. B62J 19/00; B60J 11/00
  See application file for complete search history.

(56) References Cited

U.S. PATENT DOCUMENTS

| | | | | |
|---|---|---|---|---|
| 2,311,514 A | * | 2/1943 | Bramblett | B60J 11/00 150/166 |
| 2,432,365 A | * | 12/1947 | Allen | A45C 13/002 190/115 |
| 2,495,391 A | * | 1/1950 | Smith | A47L 9/0009 206/320 |
| 3,861,092 A | | 1/1975 | Dale et al. | |
| 3,886,988 A | * | 6/1975 | Garrett | B62J 19/00 206/335 |
| 4,446,900 A | * | 5/1984 | Markovich | A45C 13/02 206/317 |
| 4,792,040 A | | 12/1988 | Wagstaff, III | |
| D322,054 S | | 12/1991 | Reiter | |
| D334,837 S | | 4/1993 | Bradley | |
| D341,552 S | | 11/1993 | Schardt | |
| D371,106 S | | 6/1996 | Taylor et al. | |
| 5,533,616 A | | 7/1996 | Crowfoot | |
| D405,045 S | | 2/1999 | Sauve et al. | |
| 6,505,637 B1 | | 1/2003 | Voorhees | |

(Continued)

FOREIGN PATENT DOCUMENTS

JP          2004148926 A   *   5/2004

*Primary Examiner* — Tri M Mai
(74) *Attorney, Agent, or Firm* — Edmund P. Anderson; North Star IP Law PLLC

(57) ABSTRACT

A motorcycle bag includes a bag body of a bag material comprising a left peripheral wall, a left sidewall attached by a first attachment to the left peripheral wall, the left peripheral wall and left sidewall comprising a left body portion configured to enclose a left side of the motorcycle, the left body portion comprising an outwardly-protruding, flexible, left attachment access port opening; a right peripheral wall opposing the left sidewall; a right sidewall attached by a second attachment to the right peripheral wall, the right peripheral wall and right sidewall comprising a right body portion, the right body portion comprising an outwardly-protruding, flexible, right attachment access port opening; a joint joining the left body portion to the right body portion and comprising a bottom side of the bag body; and a partially peripherally-extending closure configured to selectively attach and release the left sidewall to the right sidewall.

20 Claims, 22 Drawing Sheets

(56) References Cited

U.S. PATENT DOCUMENTS

| | | | |
|---|---|---|---|
| 6,718,697 B2 | 4/2004 | Voorhees | |
| D492,243 S | 6/2004 | Greene | |
| 6,857,533 B1 * | 2/2005 | Jackson | B65D 85/68 206/335 |
| D520,442 S | 5/2006 | Lucarelli et al. | |
| 7,137,422 B2 * | 11/2006 | McMillen | B62J 19/00 150/167 |
| 7,210,728 B1 * | 5/2007 | Gillig | B60J 11/00 135/93 |
| D588,978 S | 3/2009 | Powers | |
| D619,939 S | 7/2010 | Olsen | |
| D626,060 S | 10/2010 | Rians | |
| D691,549 S | 10/2013 | Kara | |
| D723,451 S | 3/2015 | Depew, Jr. | |
| D781,209 S | 3/2017 | Houck | |
| D803,762 S | 11/2017 | Greenblatt et al. | |
| D833,956 S | 11/2018 | Xiao | |
| 2005/0102917 A1 | 5/2005 | Kofler | |
| 2007/0158975 A1 | 7/2007 | Atchison et al. | |
| 2007/0289683 A1 * | 12/2007 | Linton | B60J 11/00 150/166 |
| 2012/0037286 A1 | 2/2012 | Wilkinson et al. | |
| 2014/0041773 A1 * | 2/2014 | Roberts | B62J 19/00 150/167 |
| 2016/0362065 A1 | 12/2016 | Dooling et al. | |
| 2019/0218809 A1 | 7/2019 | Pearson et al. | |
| 2020/0130765 A1 | 4/2020 | Dooling | |

* cited by examiner

SELECTIVELY OPENABLE/CLOSABLE MOTORCYCLE BAG

FIELD OF THE INVENTION

The subject invention relates generally to a motorcycle bag, more particularly to a motorcycle transportation and storage bag and a method of making and using the same.

BACKGROUND

Motorcycles are frequently transported using motor vehicles, such as cars, pickup trucks, sport utility vehicles (SUV's) and the like. Motorcycles are transported with these vehicles using various types of trailers, including many types of open bed (uncovered) trailers. Motorcycles are also transported in the open beds of pickup trucks.

When motorcycles are transported using open bed trailers or in the open beds of pickup trucks, they are exposed to the elements, including dust, dirt, stones, salt, liquid water (e.g. road spray), rain, snow, ice, road debris, solar (e.g. IR and UV) radiation, and the like, which is very undesirable.

In addition to transportation, in many areas of the world (e.g. colder climates) motorcycles are used seasonally (e.g. portions of the spring, summer, and fall), and are generally stored in the non-use seasons (e.g. portions of the fall, winter, and spring). In these climates, in addition to protection from the elements during storage, it is also necessary to protect the motorcycles from ingress of various animals and/or insects, such as various rodents (e.g. mice, rats, and chipmunks), because they are known to damage wiring, cables, seats, and other components by chewing or eating, and also because of their propensity to build nests in various components or difficult to access spaces. In all climates, including climates where year-round use is possible, it is also necessary to protect the motorcycle from ingress of the elements, animals, and insects during periods when they are not being used, including short-term and long-term periods of non-use.

Motorcycles come in a variety of configurations, including off-road (e.g. dirt bikes), on-road (e.g. road bikes), and mixed use (e.g. on-road and/or off-road bikes) configurations, all of which come a variety of size and shape configurations. Due to the variety of types, sizes, and shapes, it is difficult and expensive to manufacture rigid covers or enclosures that accommodate all of the variety of types, sizes, and shapes.

Various flexible enclosures that have openings with draw string closures are known, but these drawstrings closures leave an opening and an ingress path for the elements, animals, and insects mentioned during storage and transport, as well as for intake of the ambient air stream as the motorcycle is being transported.

Therefore, it would be very desirable to provide a flexible enclosure to accommodate the various types, sizes, and shapes of motorcycles mentioned during transportation or storage. It would also be very desirable to provide a selectively openable and closable enclosure to prevent the ingress of the elements, animals, and insects during transportation or storage when closed and to enable easy loading and unloading of the motorcycle into the enclosure.

SUMMARY OF THE INVENTION

In one embodiment, a motorcycle bag is disclosed. The motorcycle bag comprises a bag body of a bag material configured to enclose a motorcycle. The bag body comprises a left peripheral wall configured to enclose the periphery of a left side of the motorcycle along a longitudinal axis thereof, the left peripheral wall having a first open end and an opposed first closed end. The bag body also comprises a left sidewall attached by a first attachment to and enclosing the first closed end, the left peripheral wall and left sidewall comprising a left body portion configured to enclose a left side of the motorcycle, the left body portion comprising an outwardly-protruding, flexible, left attachment access port opening into the left sidewall proximate a left side of a motorcycle handlebar. The bag body also comprises a right peripheral wall opposing the left sidewall configured to enclose the periphery of a right side of the motorcycle along the longitudinal axis thereof, the right peripheral wall having a second open end and an opposed second closed end. The bag body further comprises a right sidewall attached by a second attachment to and enclosing the second closed end, the right peripheral wall and right sidewall comprising a right body portion, the right body portion comprising an outwardly-protruding, flexible, right attachment access port opening into the right sidewall proximate a right side of the motorcycle handlebar. Yet further, the bag body comprises a joint joining the first end of the left body portion to the second end of the right body portion and comprising a bottom side of the bag body. Still further, the bag body comprises a partially peripherally-extending closure configured to selectively attach and release the first end of the left sidewall to the second end of the right sidewall.

In another embodiment, a method of making a motorcycle bag is disclosed. The method comprises forming a bag body of a bag material configured to enclose a motorcycle, the bag body comprising: a left peripheral wall configured to enclose the periphery of a left side of the motorcycle along a longitudinal axis thereof, the left peripheral wall having a first open end and an opposed first closed end; a left sidewall attached by a first attachment to and enclosing the first closed end, the left peripheral wall and left sidewall comprising a left body portion configured to enclose a left side of the motorcycle, the left body portion comprising an outwardly-protruding, flexible, left attachment access port opening into the left sidewall proximate a left side of a motorcycle handlebar; a right peripheral wall opposing the left sidewall configured to enclose the periphery of a right side of the motorcycle along the longitudinal axis thereof, the right peripheral wall having a second open end and an opposed second closed end; a right sidewall attached by a second attachment to and enclosing the second closed end, the right peripheral wall and right sidewall comprising a right body portion, the right body portion comprising an outwardly-protruding, flexible, right attachment access port opening into the right sidewall proximate a right side of the motorcycle handlebar; a joint joining the first end of the left body portion to the second end of the right body portion and comprising a bottom side of the bag body; and a partially peripherally-extending, selectively openable and closable closure configured to selectively attach and release the first end of the left sidewall to the second end of the right sidewall.

In yet another embodiment, a method of using a motorcycle bag is disclosed. The method comprises forming a bag body of a bag material configured to enclose a motorcycle, the bag body comprising: a left peripheral wall configured to enclose the periphery of a left side of the motorcycle along a longitudinal axis thereof, the left peripheral wall having a first open end and an opposed first closed end; a left sidewall attached by a first attachment to and enclosing the first closed end, the left peripheral wall and left sidewall comprising a left body portion configured to enclose a left side of the motorcycle, the left body portion comprising an outwardly-protruding, flexible, left attachment access port opening into the left sidewall proximate a left side of a motorcycle handlebar; a right peripheral wall opposing the left sidewall configured to enclose the periphery of a right side of the motorcycle along the longitudinal axis thereof, the right peripheral wall having a second open end and an opposed second closed end; a right sidewall attached by a second attachment to and enclosing the second closed end, the right peripheral wall and right sidewall comprising a right body portion, the right body portion comprising an outwardly-protruding, flexible, right attachment access port opening into the right sidewall proximate a right side of the motorcycle handlebar; a joint joining the first end of the left body portion to the second end of the right body portion and comprising a bottom side of the bag body; and a partially peripherally-extending, selectively openable and closable closure configured to selectively attach and release the first end of the left sidewall to the second end of the right sidewall. The method also includes opening the partially peripherally-extending, selectively openable and closable closure to separate the left body portion and the right body portion. The method also includes inserting a motorcycle onto the bottom side. The method further includes closing the partially peripherally-extending, selectively openable and closable closure.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Referring to the figures, and particularly FIGS. 1-12, an embodiment of a selectively openable and closable motorcycle bag 10 is disclosed. The selectively openable and closable motorcycle bag 10 is configured for transport or storage of a motorcycle 100. The motorcycle bag 10 may be configured to accommodate any desired size or type of motorcycle, including off-road (e.g. dirt bikes), on-road (e.g. road bikes), and mixed use (e.g. on-road and/or off-road bikes) motorcycle 100 configurations. This includes all manner of motorcycle component configurations, including varying shapes and sizes of exhaust, suspension, fuel tank, chassis, powertrain, steering (e.g. handlebar), shift/brake levers, wheel, brake, foot rest, kick stand, shifter, foot brake, mirror, gauge, display, infotainment electronics, storage, accessory, and other components. The elements of the selectively openable and closable motorcycle bag 10 described herein may be configured to accommodate the various motorcycle 100 configurations, including various combinations of the motorcycle component configurations described.

The selectively openable and closable motorcycle bag 10 includes a bag body 12 comprising a bag material 14 configured to enclose the motorcycle 100. Any suitable bag body material 14 may be used, including various water-resistant and waterproof fabrics and polymer sheet or film materials. In one embodiment, the bag body material 14 comprises waterproof polymer-coated fabrics or polymer sheet or film materials. In one embodiment, the waterproof polymer-coated fabric comprises various weights of poly vinyl chloride (PVC) coated polyester fabric, including various weights or grades as are known in the art ranging from 18 oz. to 40 oz., and including one-side coated and two-side coated fabrics. In another embodiment, the waterproof polymer-coated fabric comprises various weights of polymer-coated nylon. In another embodiment, the waterproof polymer sheet or film comprises various weights or -coated fabric comprises various weights or grades of polymer-coated nylon. In another embodiment, the waterproof polymer sheet or film comprises sheets and films of various weights and grades of polyurethane.

Figure 14:
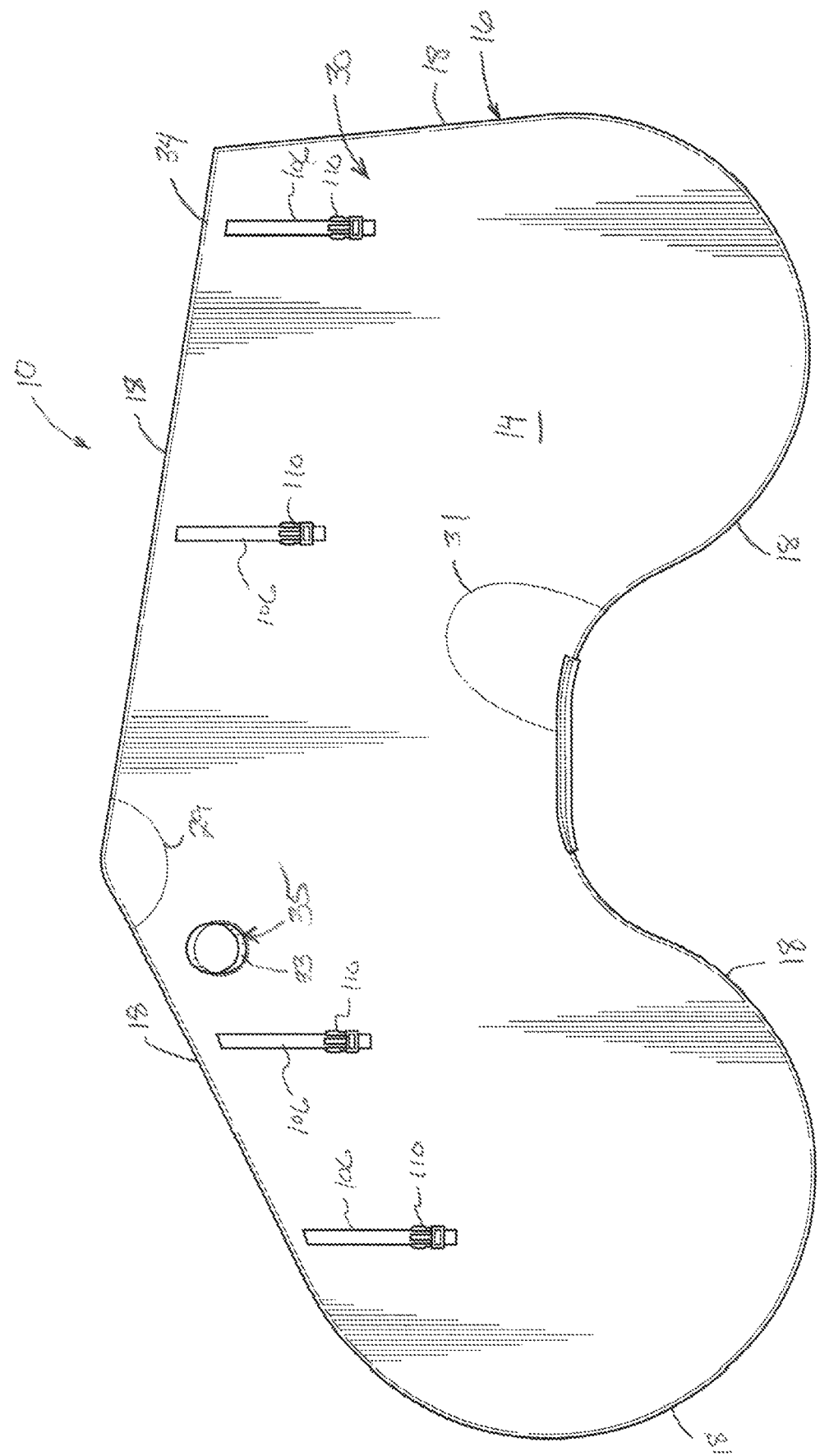
FIG. 14 is a left side view of the embodiment of FIG. 12.
Figure 15:
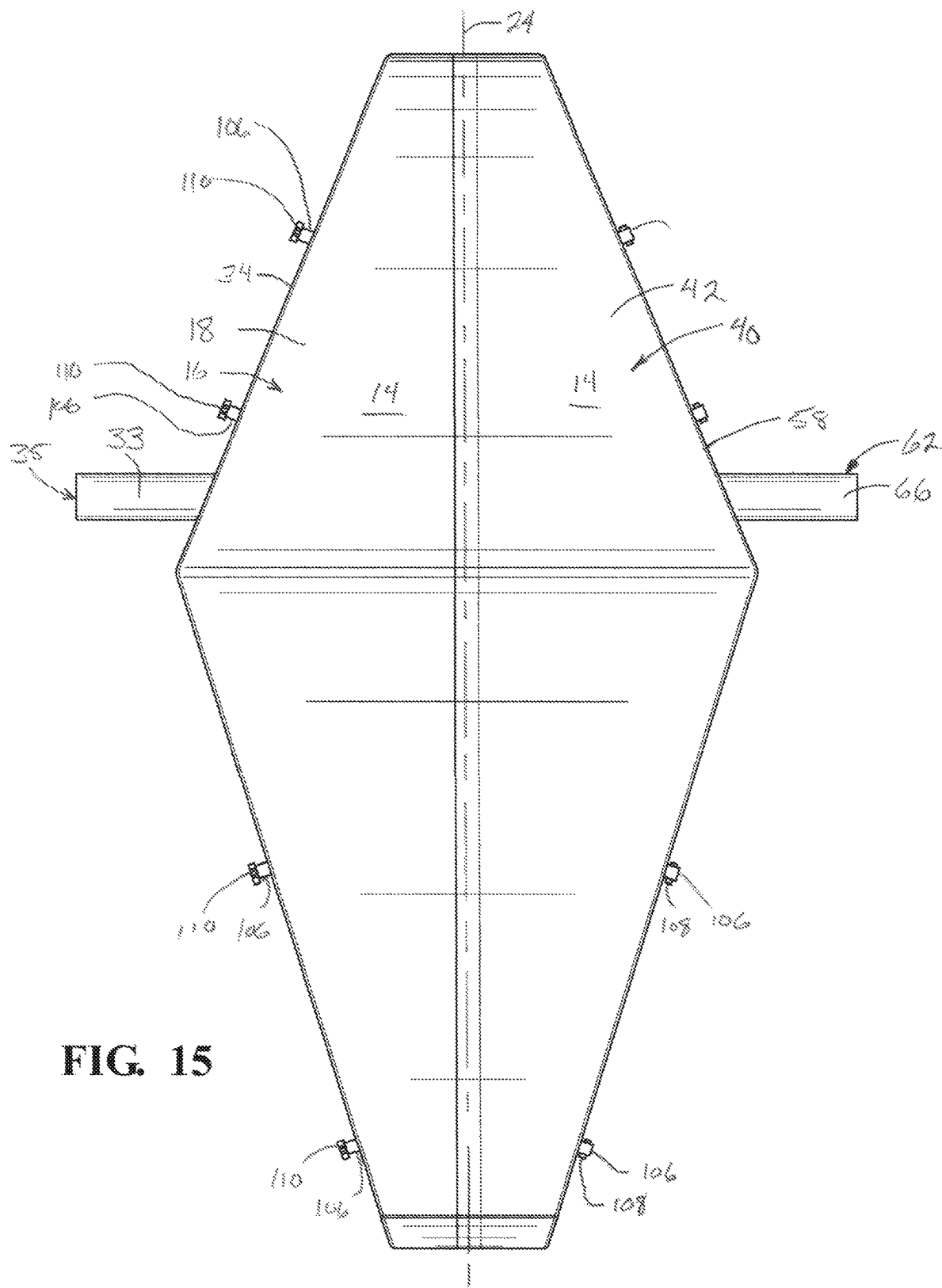
FIG. 15 is a top view of the embodiment of FIG. 12.
Figure 16:
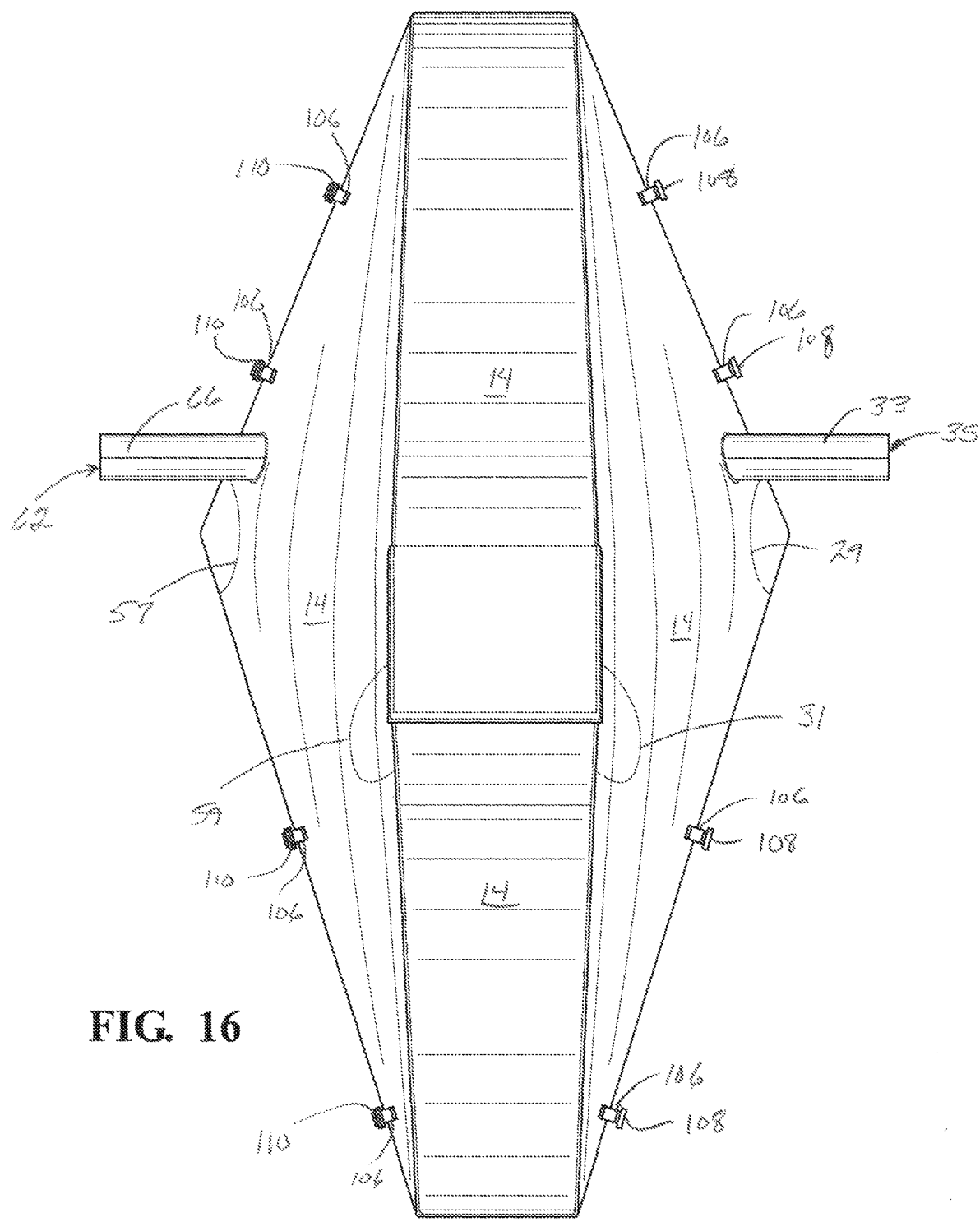
FIG. 16 is a bottom view of the embodiment of FIG. 12.
Figure 17:
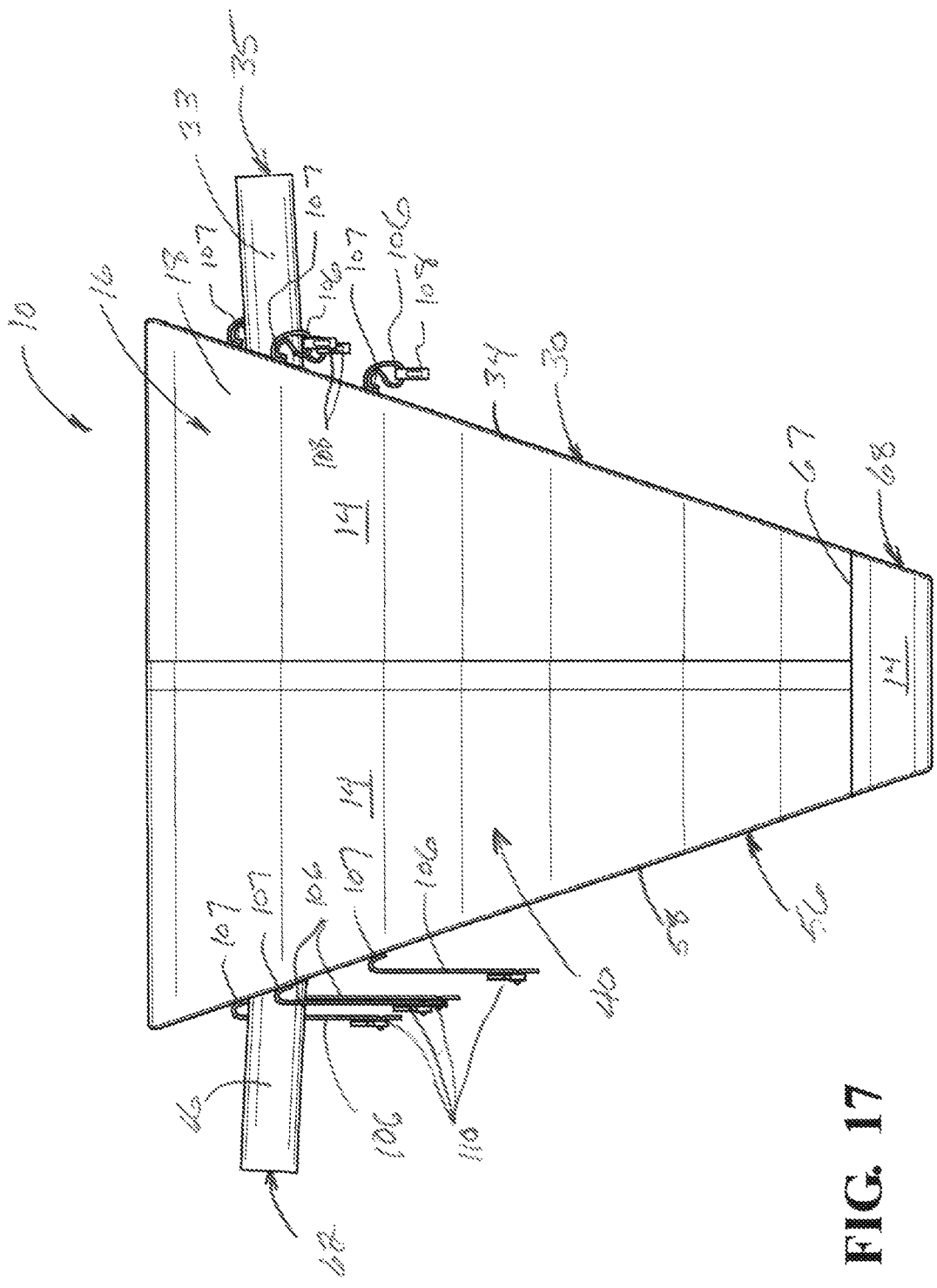
FIG. 17 is a front view of the embodiment of FIG. 12.
Figure 18:
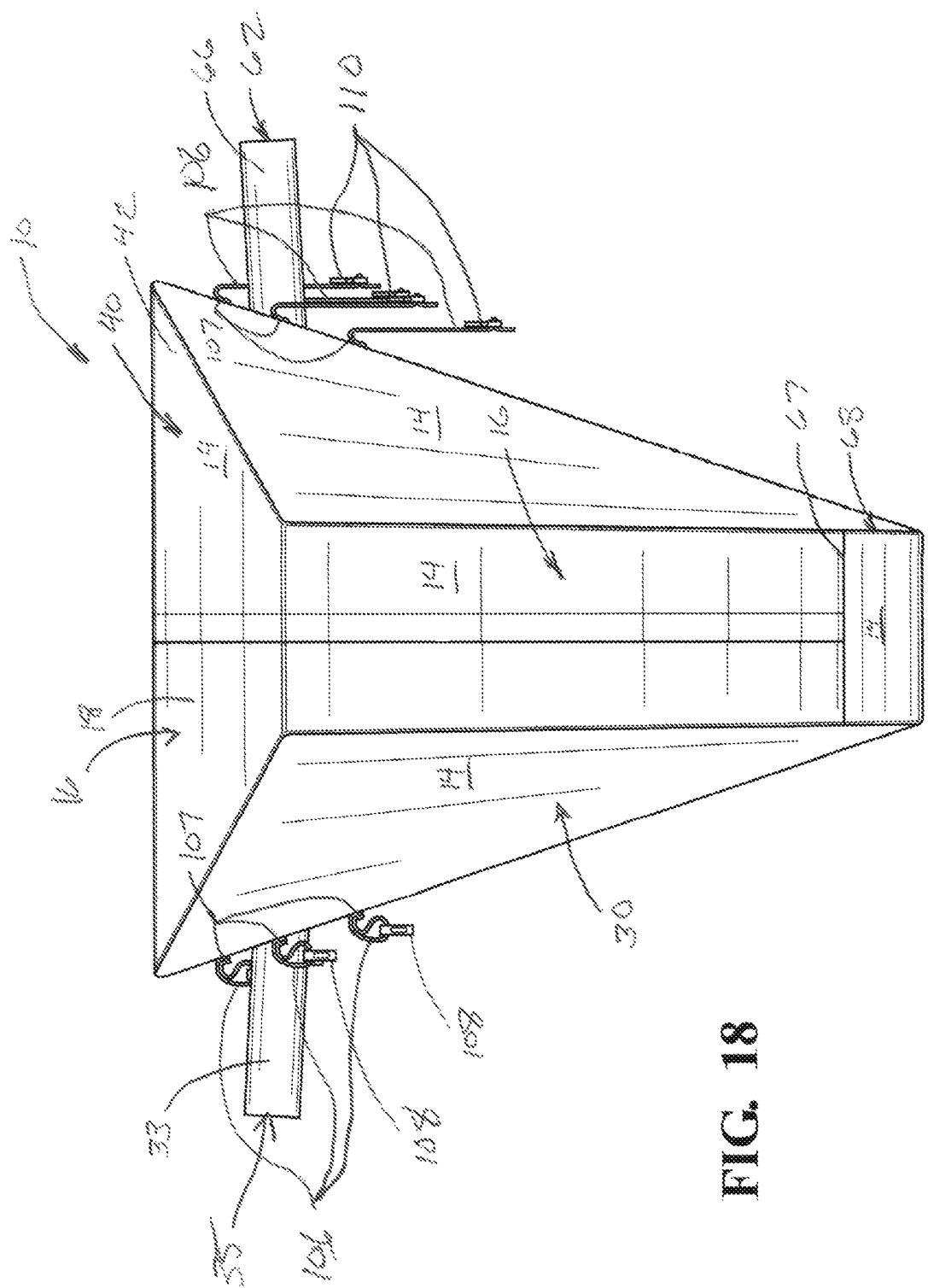
FIG. 18 is a rear view of the embodiment of FIG. 12.
Figure 19:
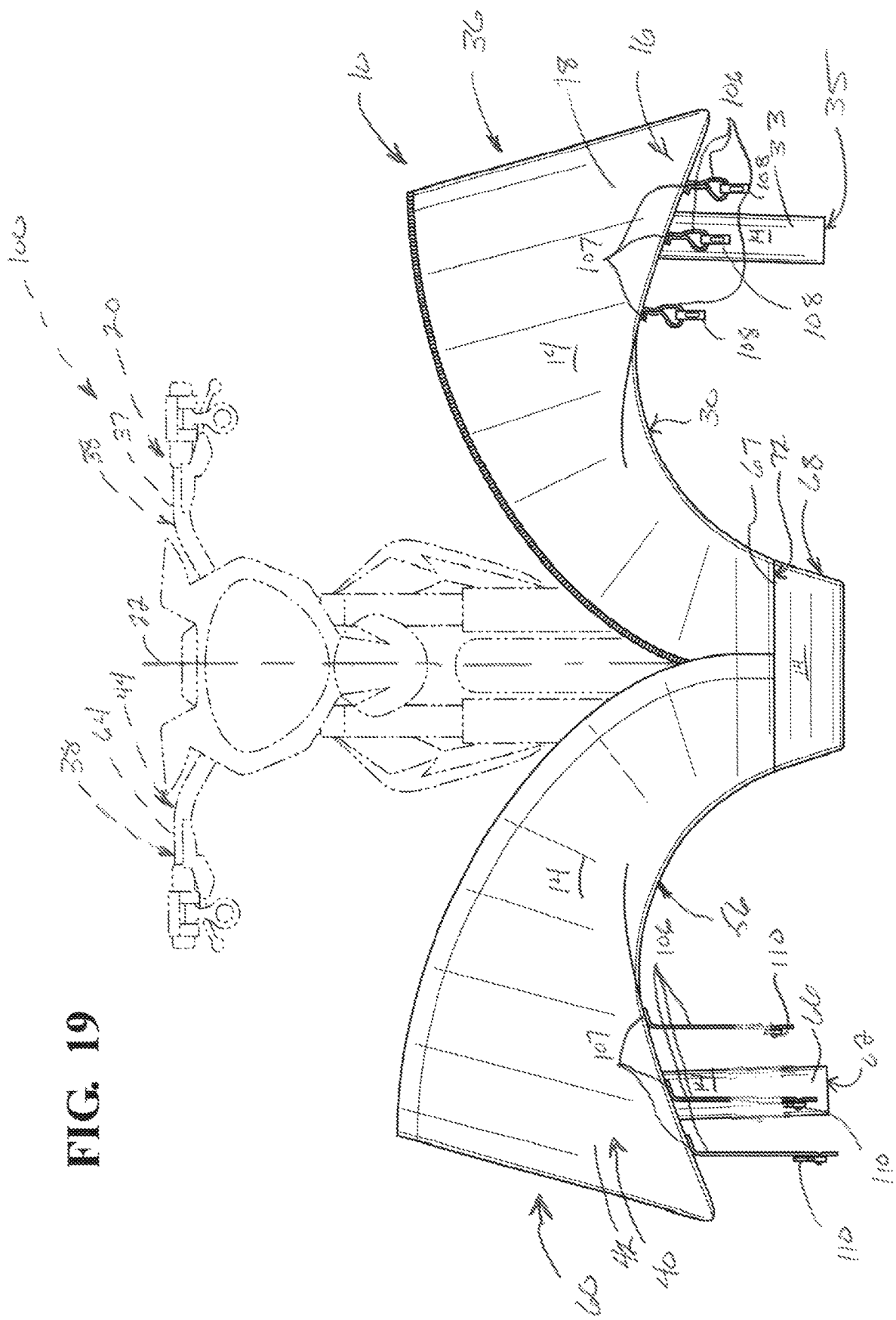
FIG. 19 is a front view of the embodiment of FIG. 12 in an open/unzipped condition illustrating, in phantom, a motorcycle disposed therein having a pair of selectively attachable/detachable attachment points disposed on the motorcycle handlebars.

The bag body 12 includes a left peripheral wall 16 of the bag material 14 configured to enclose the left periphery 18 of a left side 20 of the motorcycle 100 (as demarcated by a vertical plane 22 in FIGS. 8 and 19) along a longitudinal axis 24 (FIGS. 4 and 15) of the motorcycle bag 10. The left peripheral wall 16 has a first open end 26 that opens into the interior of the bag and an opposed first closed end 28 that is enclosed or closed in by the left sidewall 30 that is attached thereto, as illustrated, for example, in FIGS. 3, 4, 8, 14, 15, and 19. In other words, the left peripheral wall 16 extends generally laterally from the longitudinal axis 24 and is configured to extend peripherally around and surround and enclose the left periphery 18 of the left side 20 of the motorcycle 100. The extent and profile of the left periphery 18 is indicated generally by the phantom line 32 that surrounds the left periphery in FIGS. 3 and 14, for example.

Figure 1:
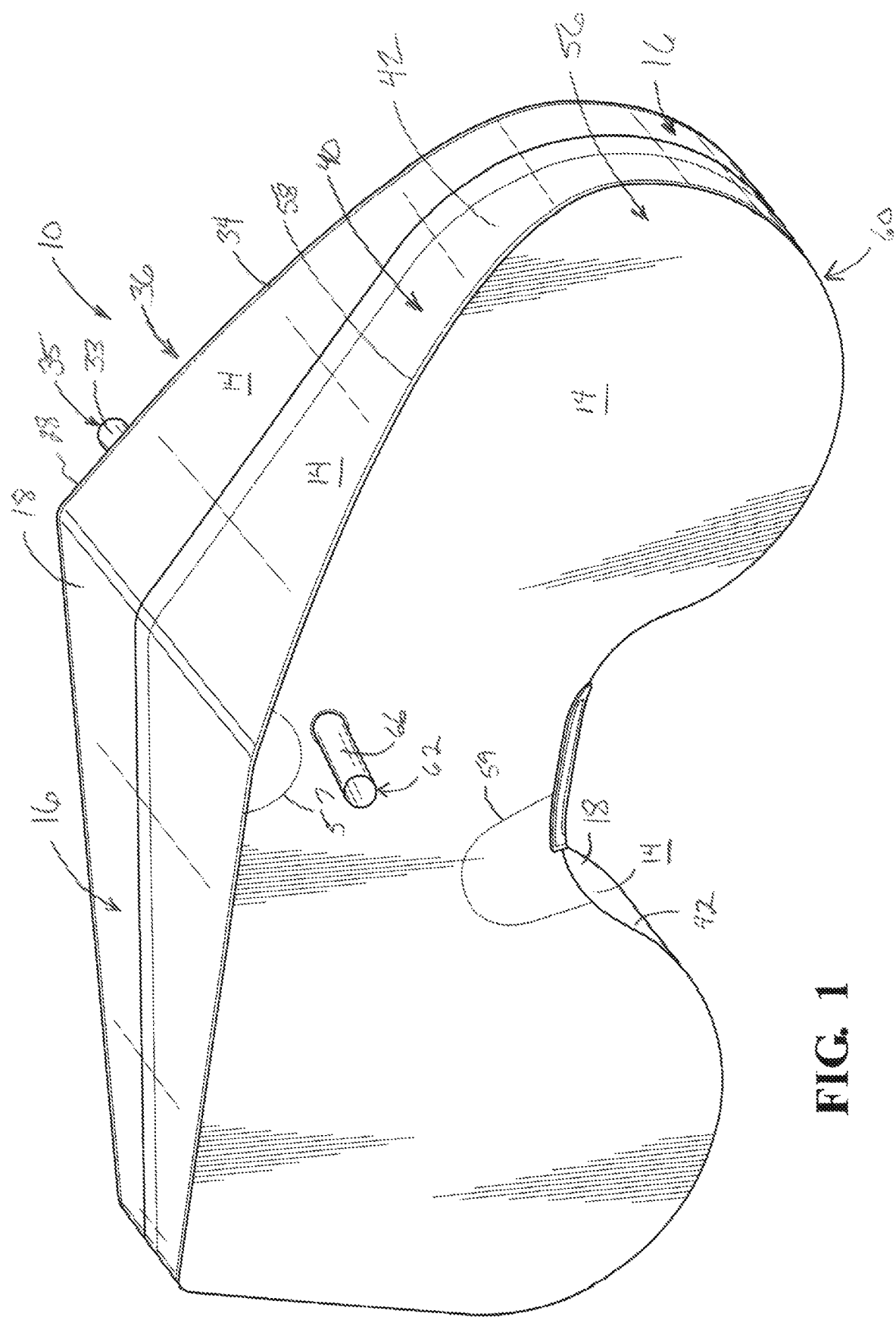
FIG. 1 is a perspective view of the front, top and right sides of an embodiment of a motorcycle bag with two partially peripherally-extending, centrally-overlapping zippers, two outwardly-protruding, flexible, attachment access ports, and a selectively openable and closable motorcycle stand access panel (closed condition) showing our new design with the zippers and bag in a closed/zipped condition and the zippers covered by a storm flap.
Figure 2:
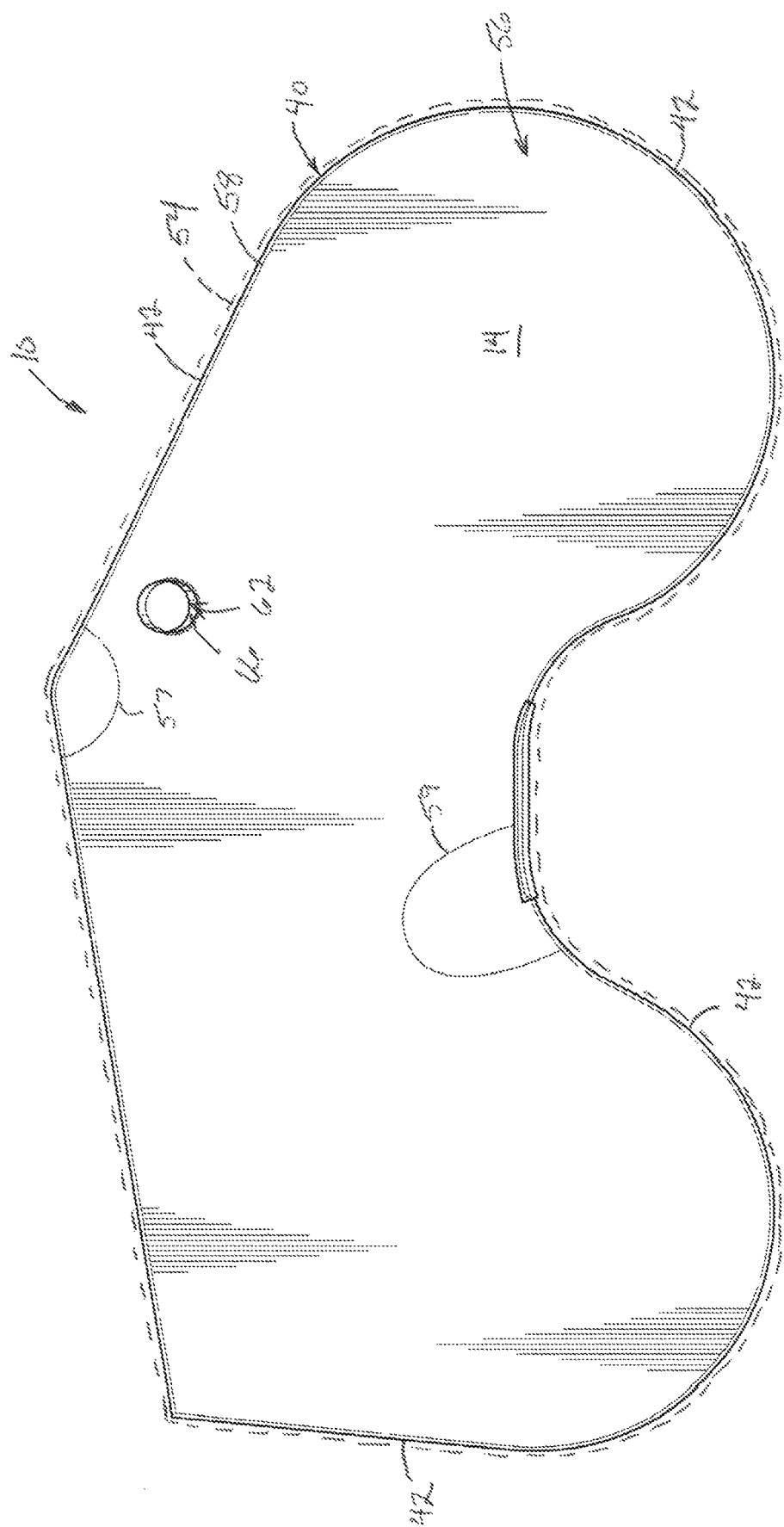
FIG. 2 is a right side view thereof.
Figure 3:
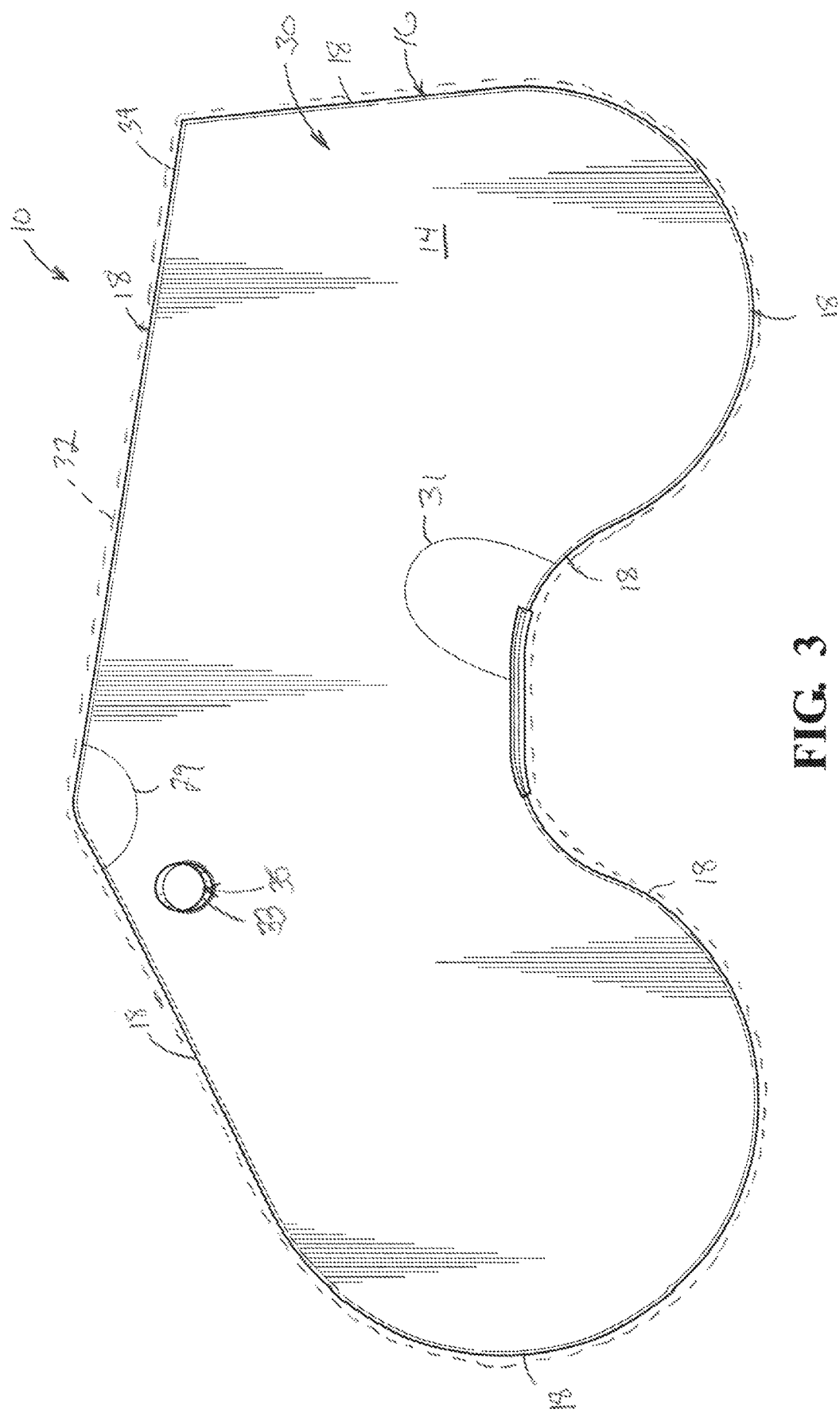
FIG. 3 is a left side view thereof.
Figure 4:
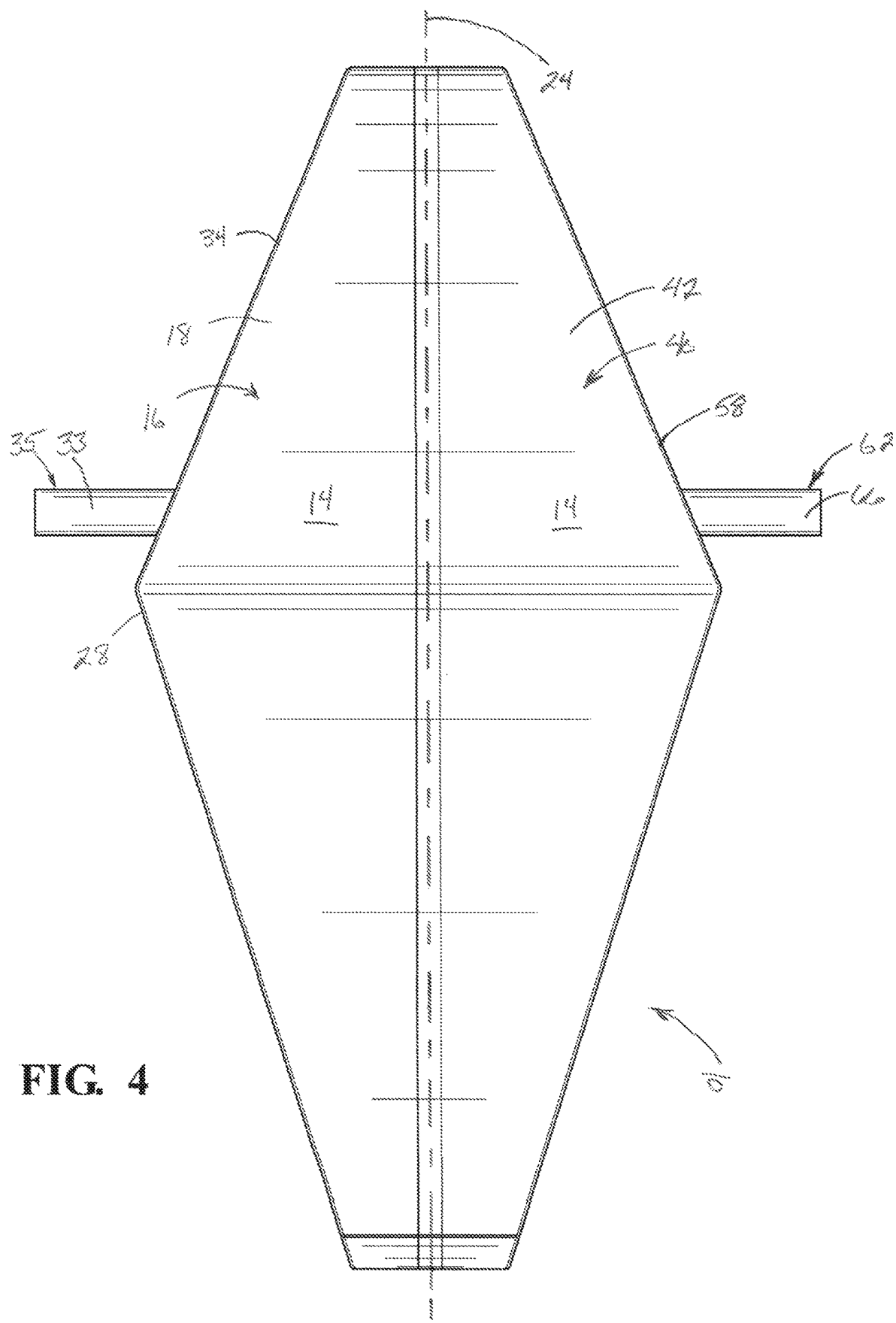
FIG. 4 is a top view thereof.
Figure 5:
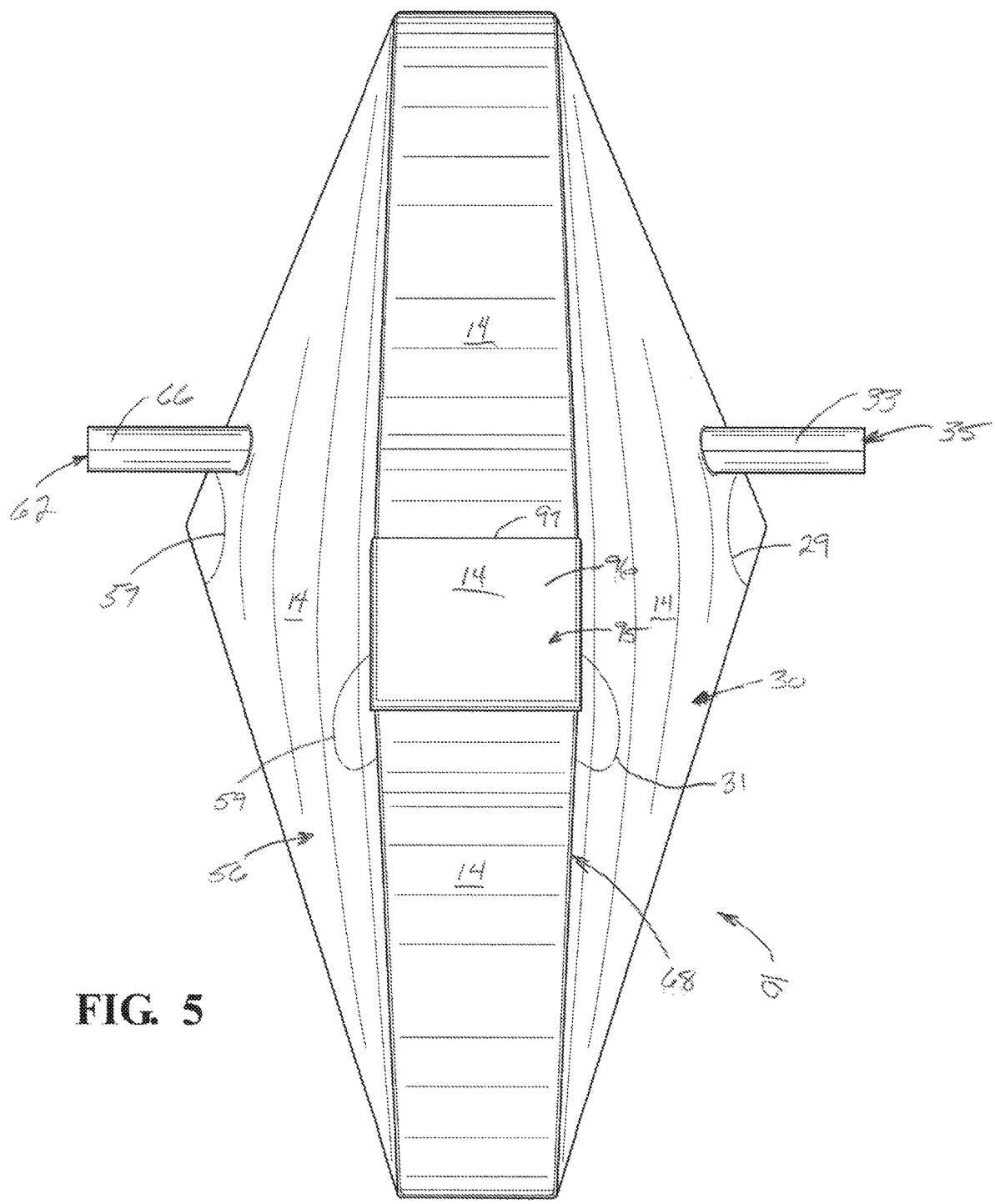
FIG. 5 is a bottom view thereof.
Figure 6:
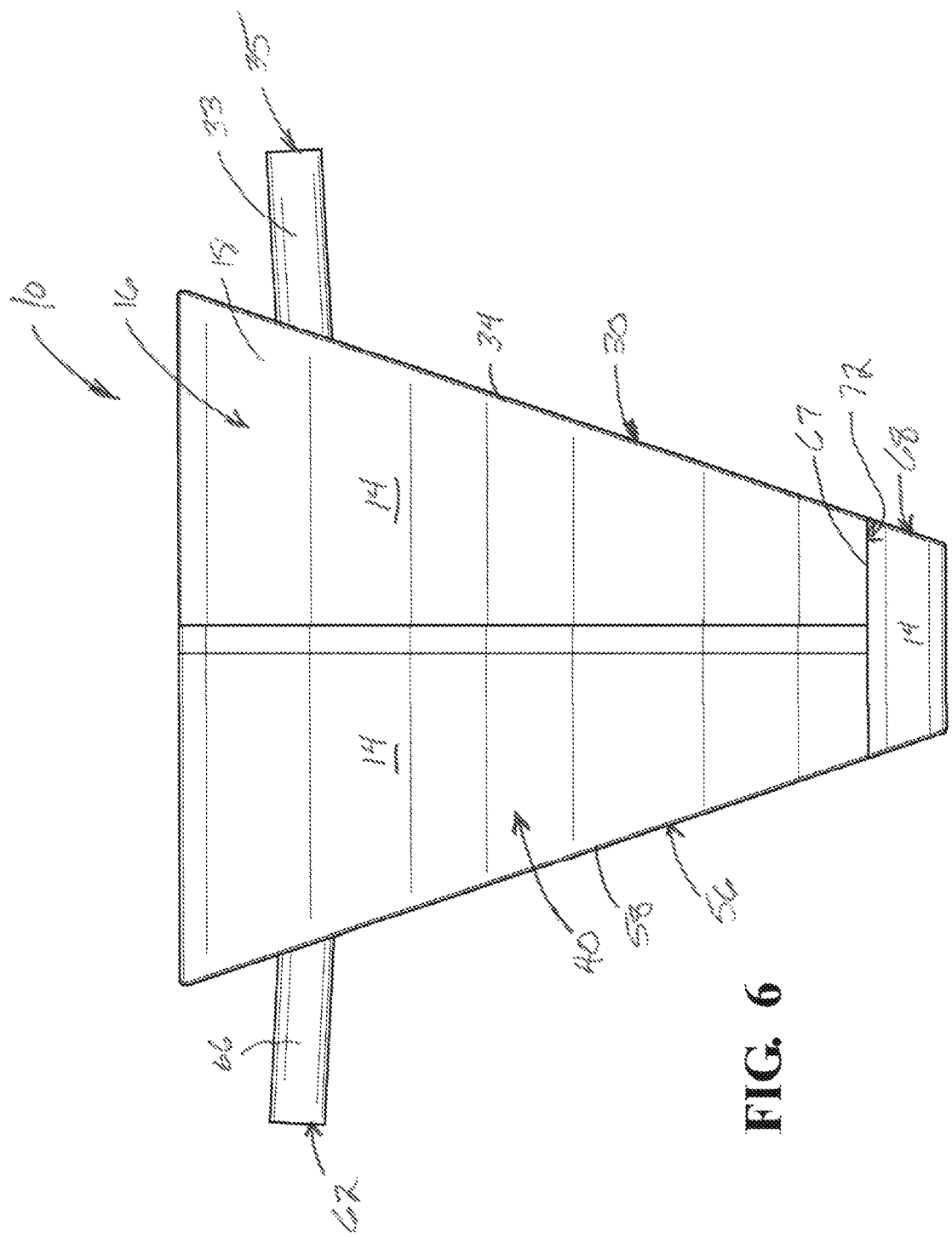
FIG. 6 is a front view thereof.
Figure 7:
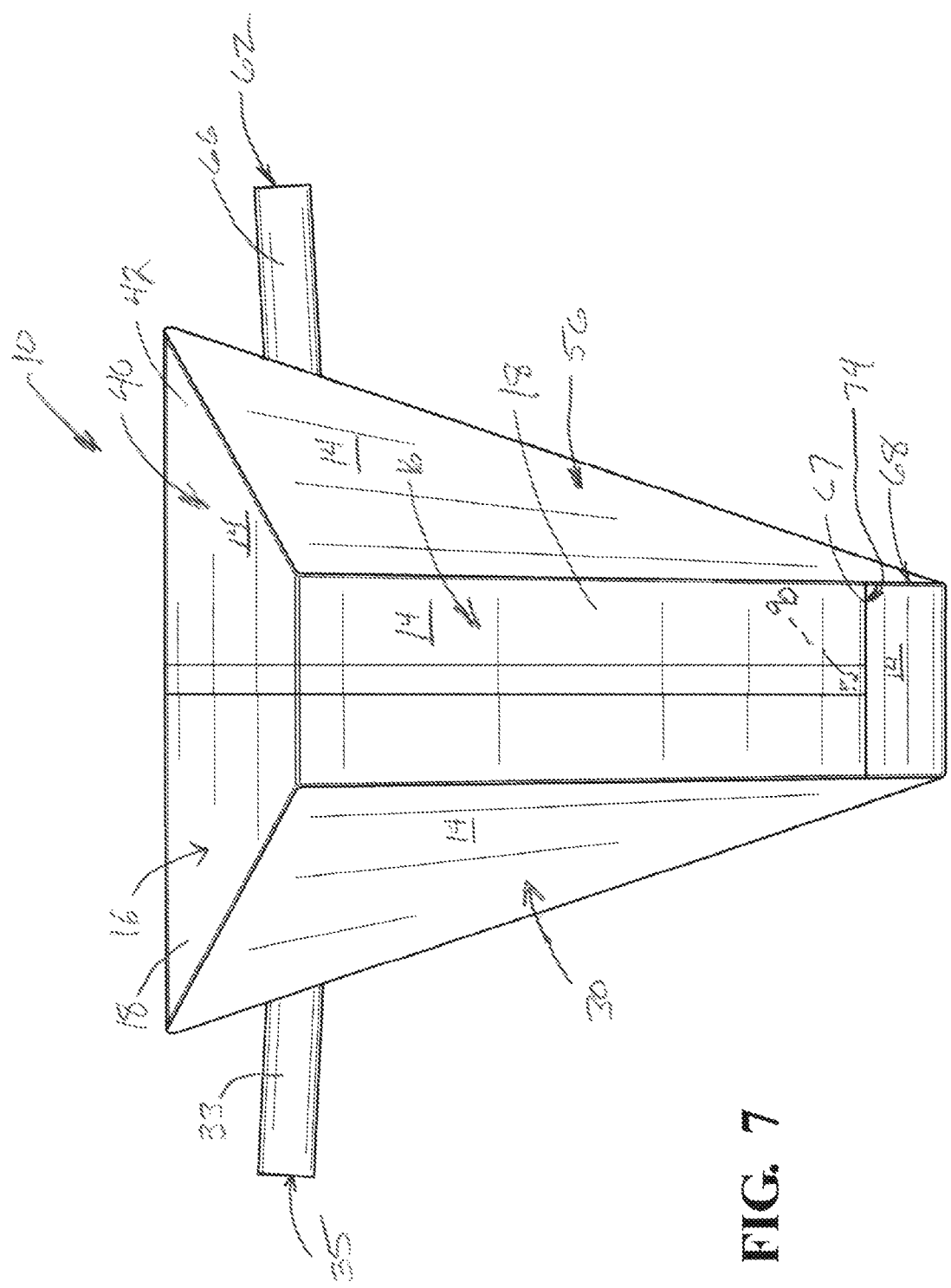
FIG. 7 is a rear view thereof.
Figure 8:
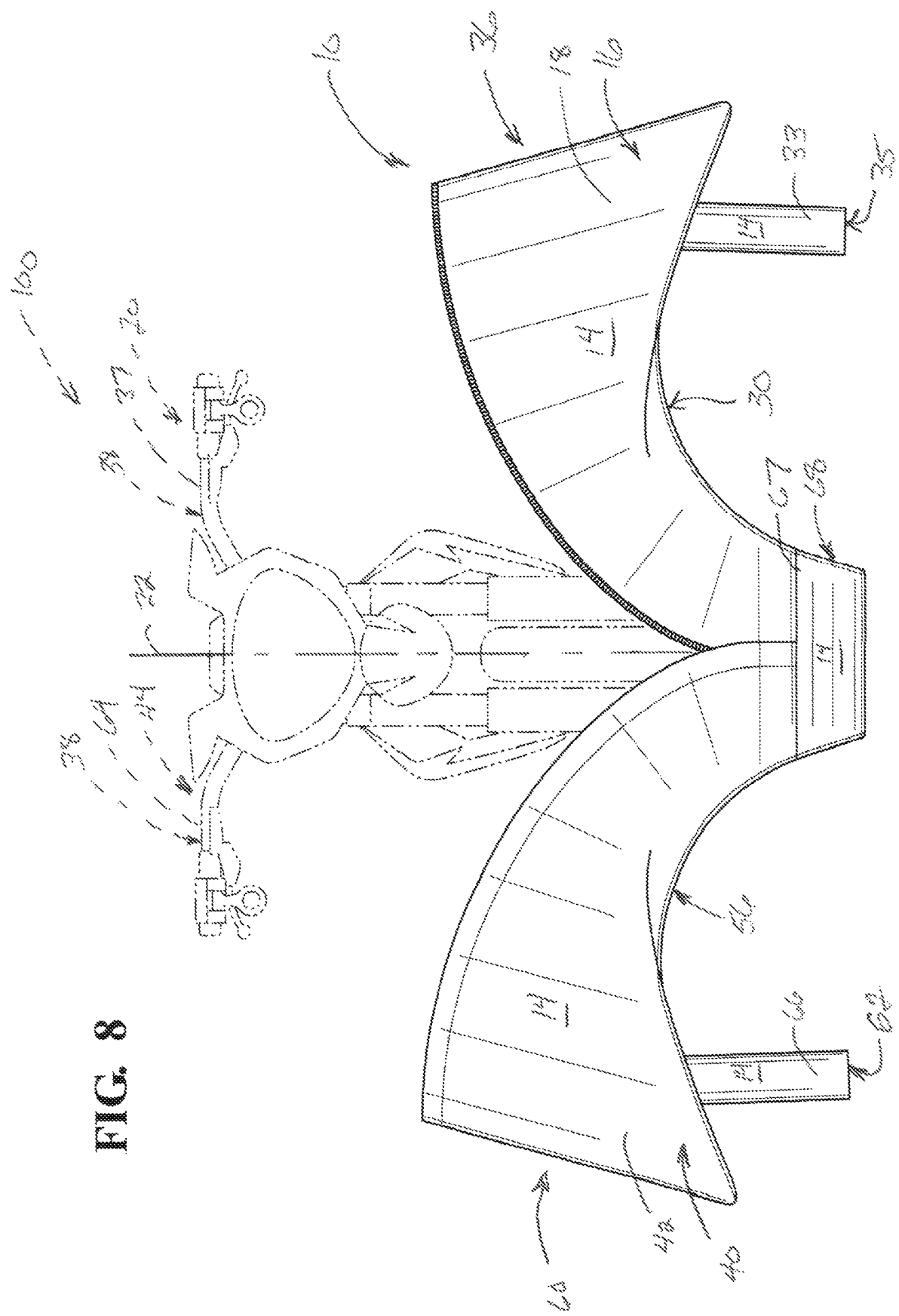
FIG. 8 is a front view thereof in an open/unzipped condition illustrating, in phantom, a motorcycle disposed therein having a pair of selectively attachable/detachable attachment points disposed on the motorcycle handlebars.
Figure 9:
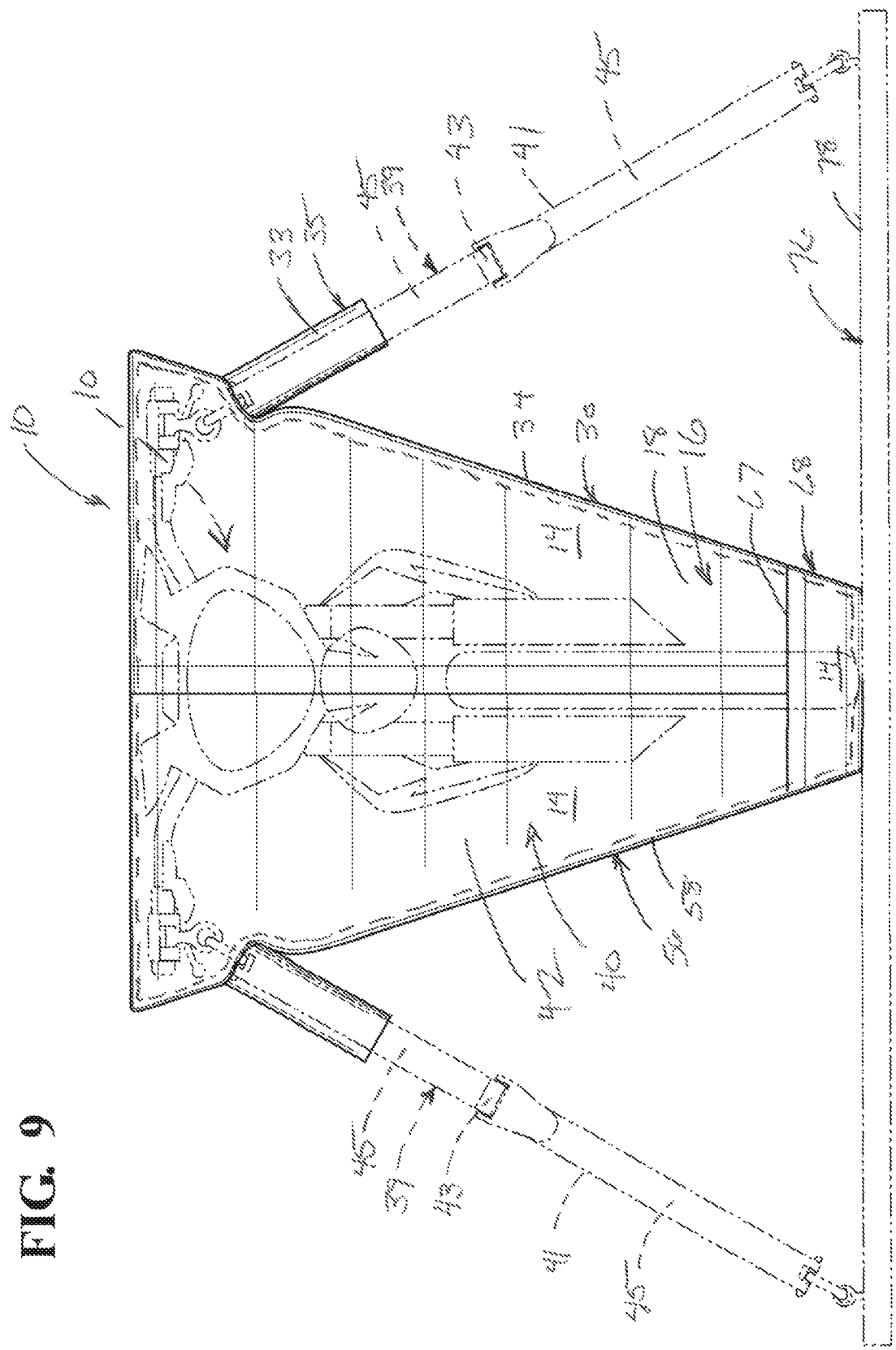
FIG. 9 is the front view of FIG. 6 thereof in the closed/zipped condition illustrating, in phantom, a motorcycle disposed therein that is detachably attached to a transportation deck using the attachment points by a pair of selectively adjustable tensioning straps.
Figure 20:
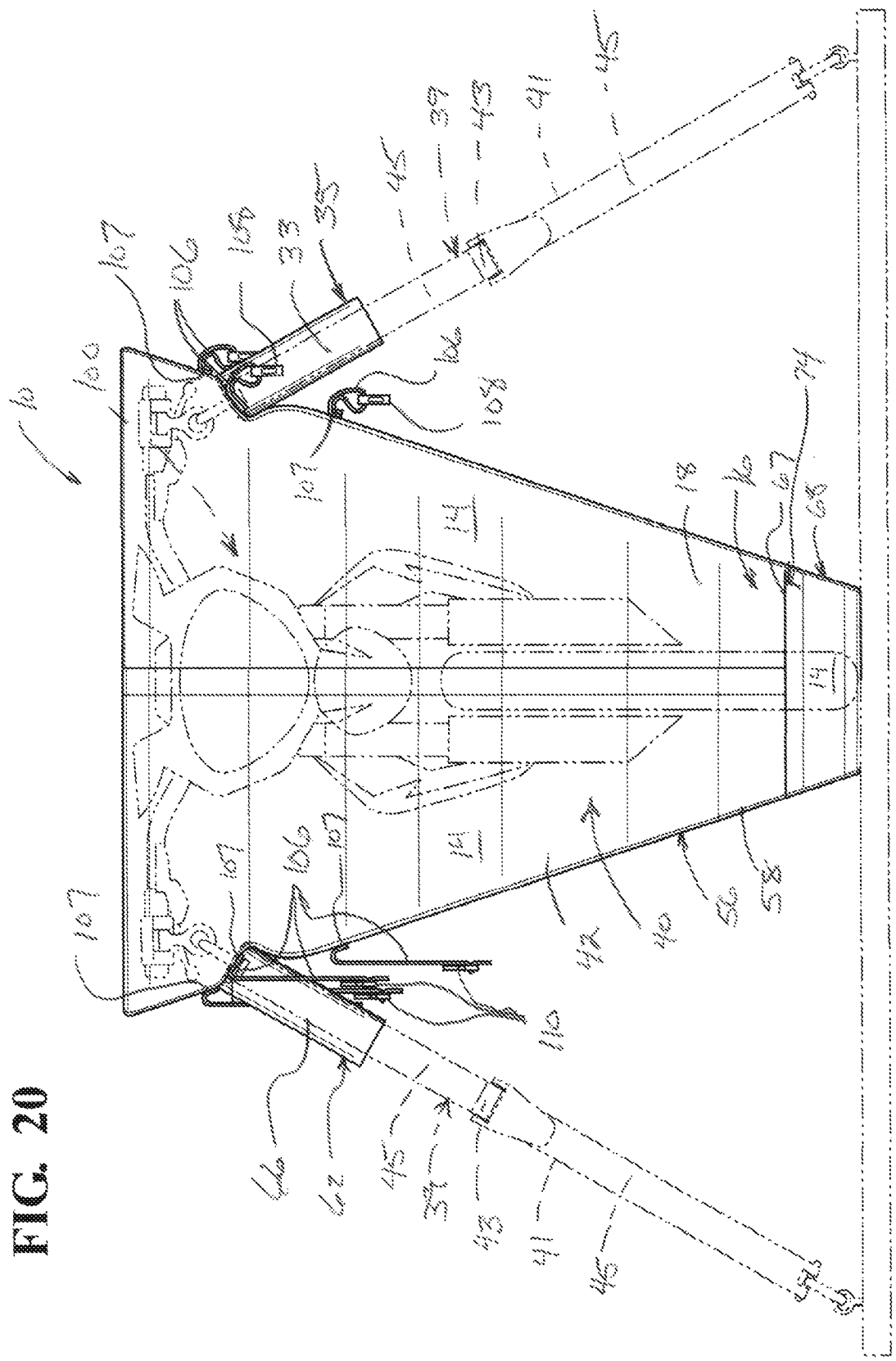
FIG. 20 is the front view of the embodiment of FIG. 12 in the closed/zipped condition illustrating, in phantom, a motorcycle disposed therein that is detachably attached to a transportation deck using the attachment points by a pair of selectively adjustable tensioning straps.

The bag body 12 also includes a left sidewall 30 of the bag material 14 attached by a first attachment 34 to and enclosing the first closed end 28. The attachment 34 may include any suitable attachment, including, in one embodiment a water-resistant stitched seam formed by sewing, and in another embodiment, a waterproof welded seam formed by a welding process, such as ultrasonic, RF or thermal welding. The left sidewall 30 may include an upper reinforcement patch 29 and lower reinforcement patch 31 of the bag material 14 that are attached by stitched or welded seams as described herein to the outwardly or inwardly facing surfaces. The left peripheral wall 16 and left sidewall 30 comprise a left body portion 36 configured to enclose the left side 20 of the motorcycle 100. The left body portion 36 also comprises an outwardly-protruding, flexible, left attachment access port 35 that is configured to open into the left sidewall 30 proximate a left side 37 of a motorcycle handlebar 38 as shown in FIGS. 8, 9, 19, and 20. The outwardly-protruding, flexible, left attachment access port 35 may be attached by stitched or welded seams as described here. In one embodiment, the outwardly-protruding, flexible, left attachment access port 35 comprises a flexible tube 33 of the bag material 14. The outwardly-protruding, flexible, left attachment access port 35 is configured to receive a selectively adjustable tensioning strap 39. Any suitable tensioning strap 39 may be used, including all manner of ratcheting tensioning straps 41 that include a ratchet mechanism 43 to tension the strap members 45 as shown in FIGS. 9 and 20.

The bag body 12 also includes a right peripheral wall 40 opposite or opposing the left peripheral wall 16 that is configured to enclose the right periphery 42 of a right side 44 of the motorcycle 100 along the longitudinal axis 24 of the motorcycle bag 10. The right peripheral wall 40 has a second open end 46 that opens into the interior of the bag and an opposed second closed end 48 that is enclosed or closed in by the right sidewall 56 that is attached thereto, as illustrated, for example, in FIGS. 2, 4, and 8. In other words, the right peripheral wall 40 extends generally laterally from the longitudinal axis 24 and is configured to extend peripherally around and surround and enclose the right periphery 42 of the right side 44 of the motorcycle 100. The extent and profile of the right periphery 42 is indicated generally by phantom line 54 that surrounds the right periphery in FIG. 2, for example.

The bag body 12 also includes a right sidewall 56 attached by a second attachment 58 to and enclosing the second closed end 48. The second attachment 58 may include any suitable attachment, including, in one embodiment a stitched seam formed by sewing, and in another embodiment, a welded seam formed by a welding process, such as ultrasonic, RF or thermal welding. The right sidewall 56 may include an upper reinforcement patch 57 and lower reinforcement patch 59 of the bag material 14 that are attached by stitched or welded seams as described herein to the outwardly or inwardly facing surfaces. The right peripheral wall 40 and right sidewall 56 comprise a right body portion 60 configured to enclose the right side 44 of the motorcycle 100. The right body portion 60 also comprises an outwardly-protruding, flexible, right attachment access port 62 that is configured to open into the right sidewall 56 proximate a right side 64 of the motorcycle handlebar 38. The outwardly-protruding, flexible, right attachment access port 62 may be attached by stitched or welded seams as described herein. In one embodiment, the outwardly-protruding, flexible, right attachment access port 62 comprises a flexible tube 66 of the bag material 14. The outwardly-protruding, flexible, right attachment access port 62 is configured to receive a selectively adjustable tensioning strap 39. Any suitable tensioning strap 39 may be used, including all manner of ratcheting tensioning straps 41 that include a ratchet mechanism 43 to tension the strap members 45 as shown in FIGS. 9 and 20.

The bag body 12 also includes a joint 67 joining the first open end 26 of the left peripheral wall 16 of the left body portion 36 to the second open end 46 of the right peripheral wall 40 of the right body portion 60 and comprising a bottom side 68 of the bag body. In one embodiment (not shown), the joint 67 may be formed by joining or attaching the left peripheral wall 16 to the right peripheral wall 40 along the bottom side 68 of the bag body. Alternately, the bottom side 68 may comprise a single piece of bag body material 14 that is a joined or attached to and as a portion of the left peripheral wall 16 and the right peripheral wall 40 by joints 67 as shown in FIGS. 5-7 and 16-18, for example.

Figure 10:
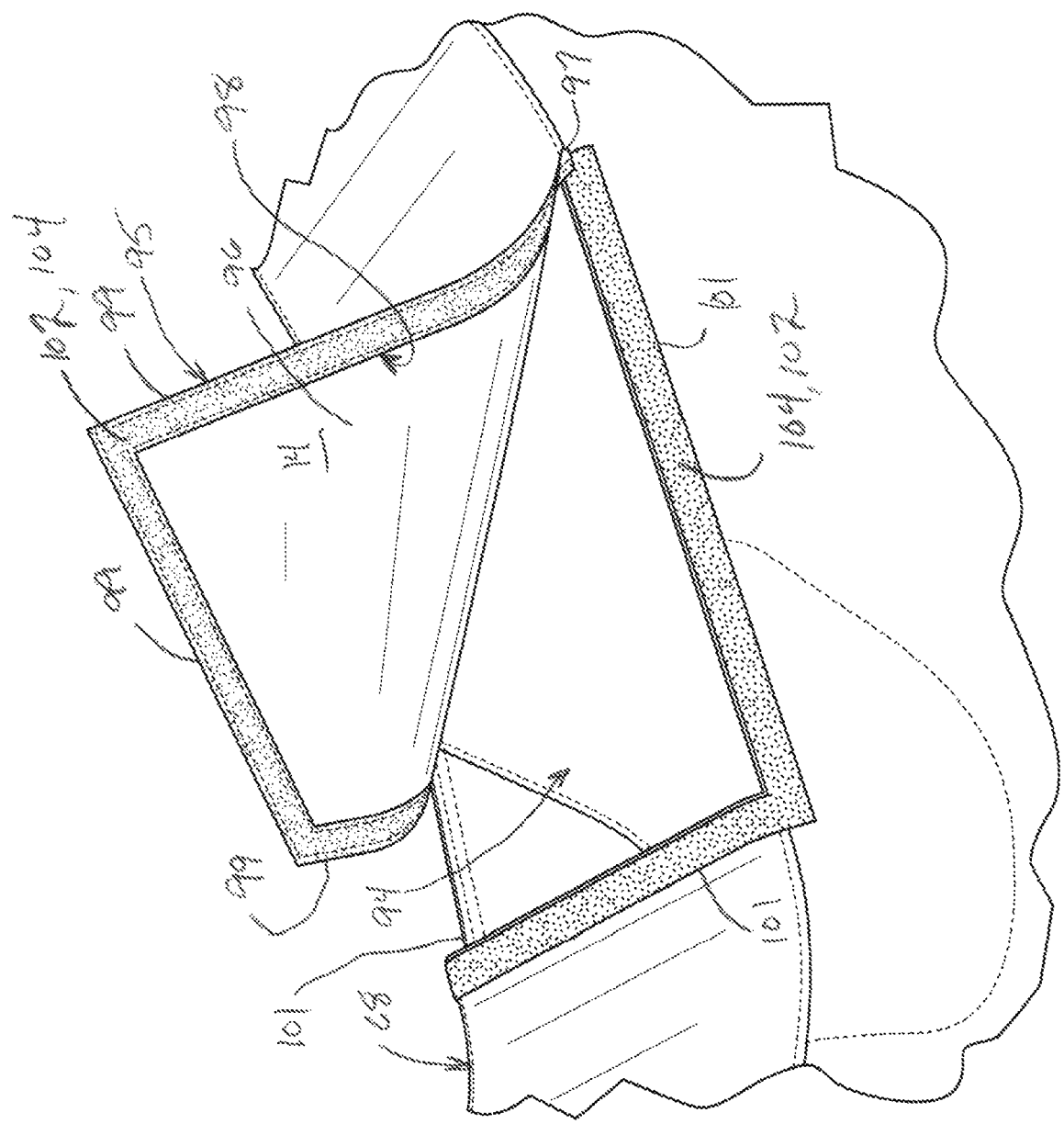
FIG. 10 is an enlarged partial bottom view thereof illustrating the motorcycle stand access panel in a partially open condition.
Figure 11:
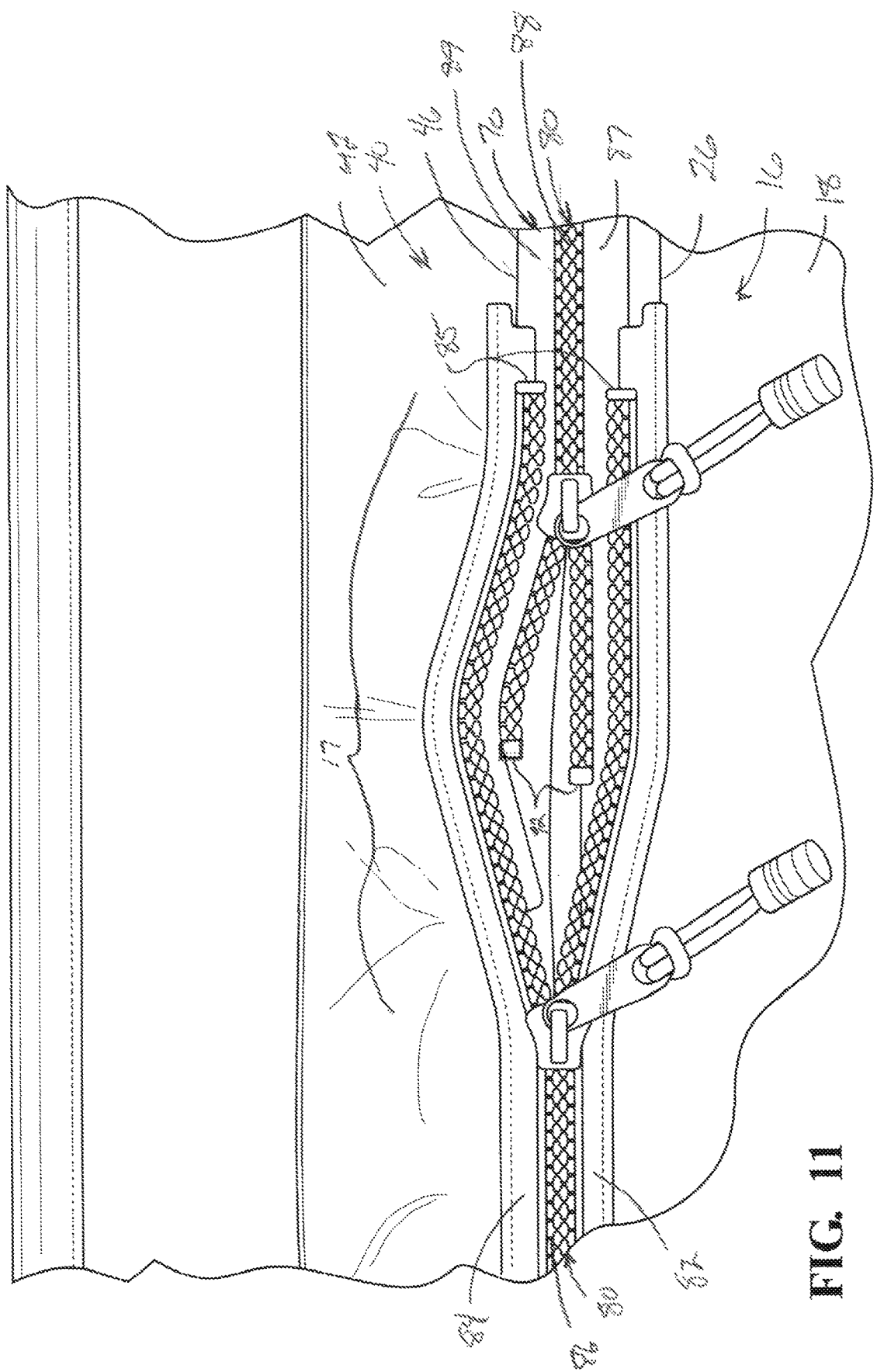
FIG. 11 is an enlarged partial top view thereof with the two partially peripherally-extending, centrally overlapping zippers in a partially open/unzipped condition revealing an overlapping configuration of the zippers.
Figure 12:
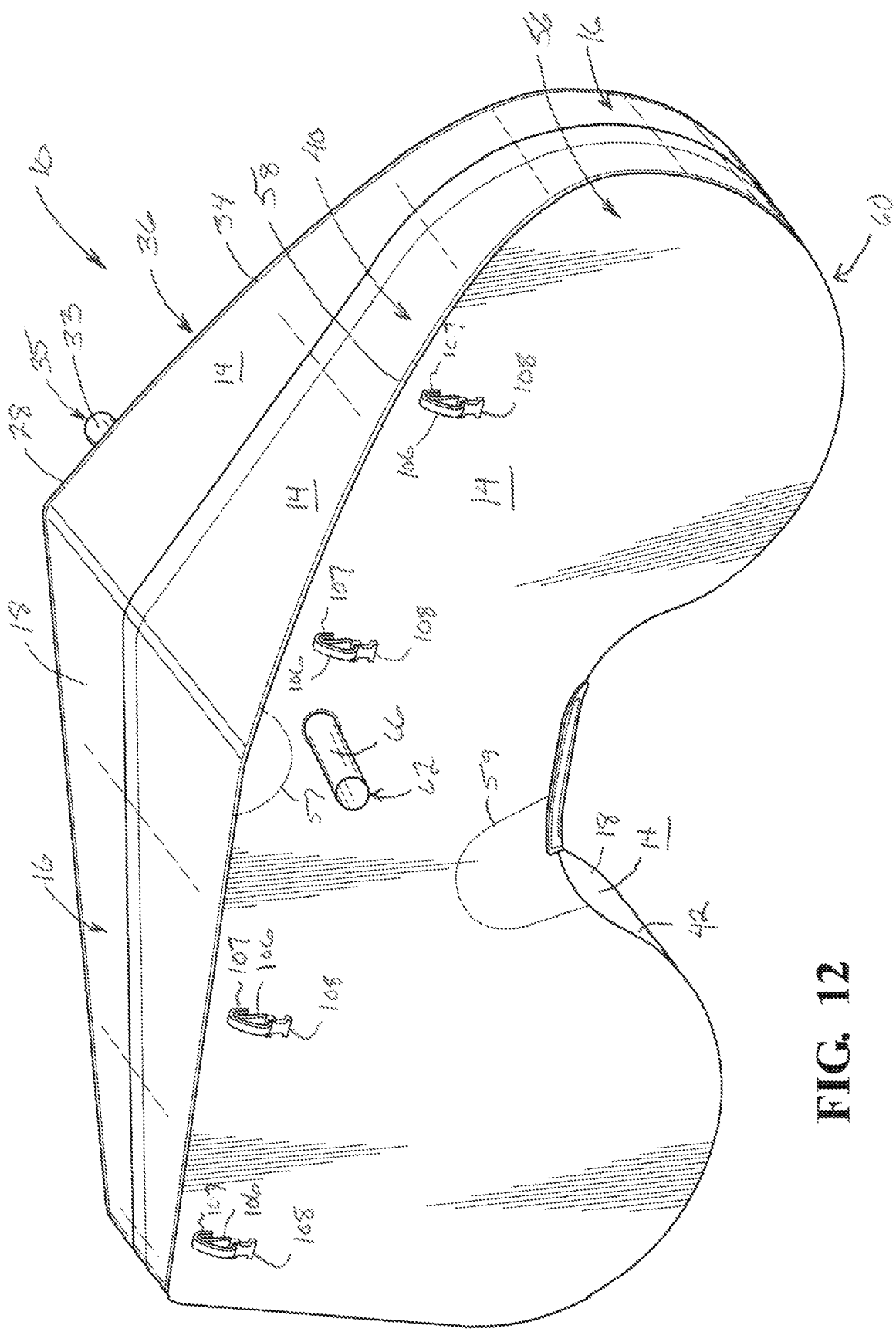
FIG. 12 is a perspective view of the front, top and right sides of a second embodiment of a motorcycle bag with two partially peripherally-extending, centrally-overlapping zippers, two outwardly-protruding, flexible, attachment access ports, opposing pairs of cinching straps with selectively lockable/unlockable, male/female buckles, and a selectively openable and closable motorcycle stand access panel (closed condition) showing our new design with the zippers and bag in a closed/zipped condition and the zippers covered by a storm flap.
Figure 13:
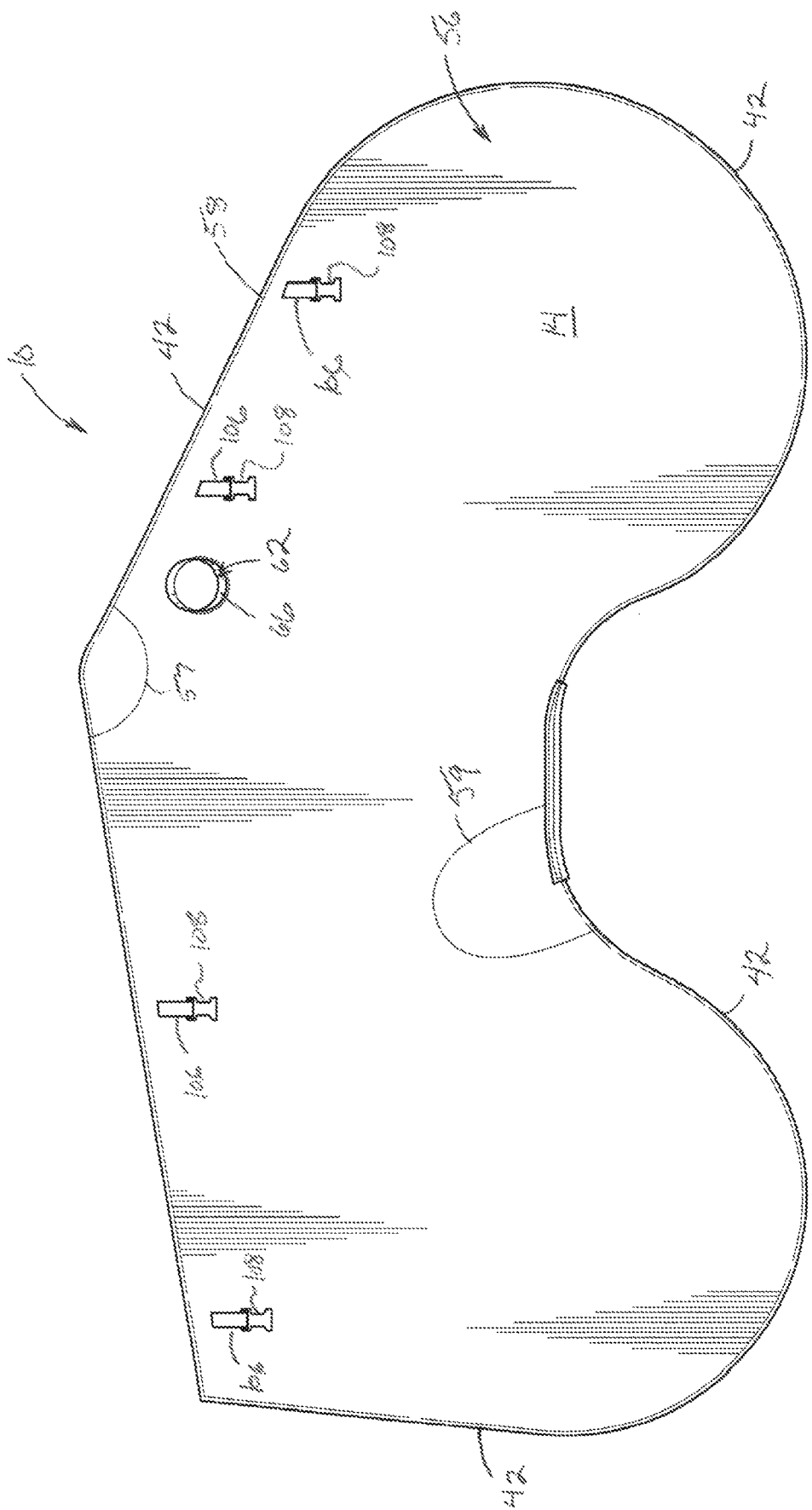
FIG. 13 is a right side view of the embodiment of FIG. 12.
Figure 21:
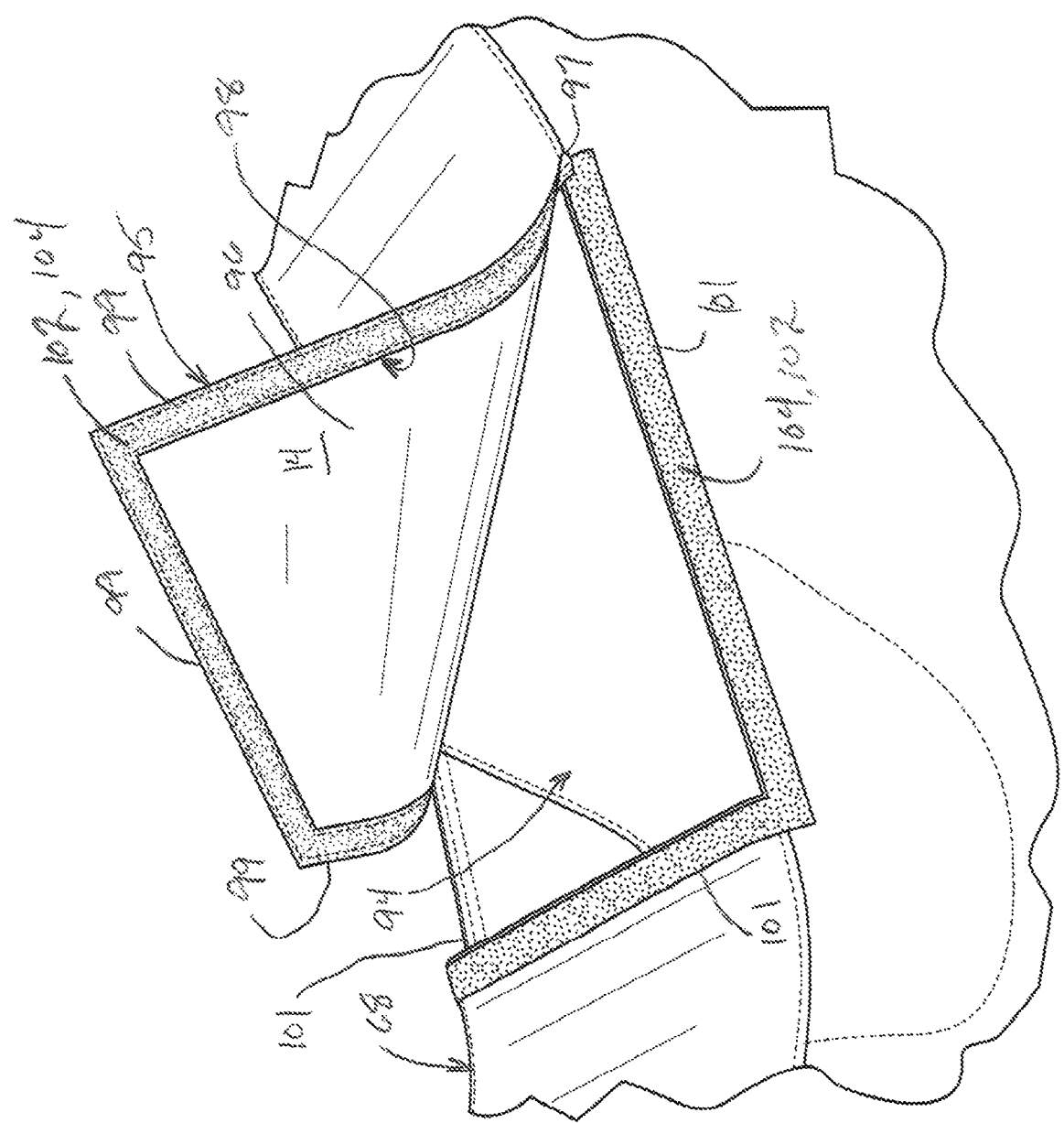
FIG. 21 is an enlarged partial bottom view of the embodiment of FIG. 12 illustrating the motorcycle stand access panel in a partially open condition.
Figure 22:
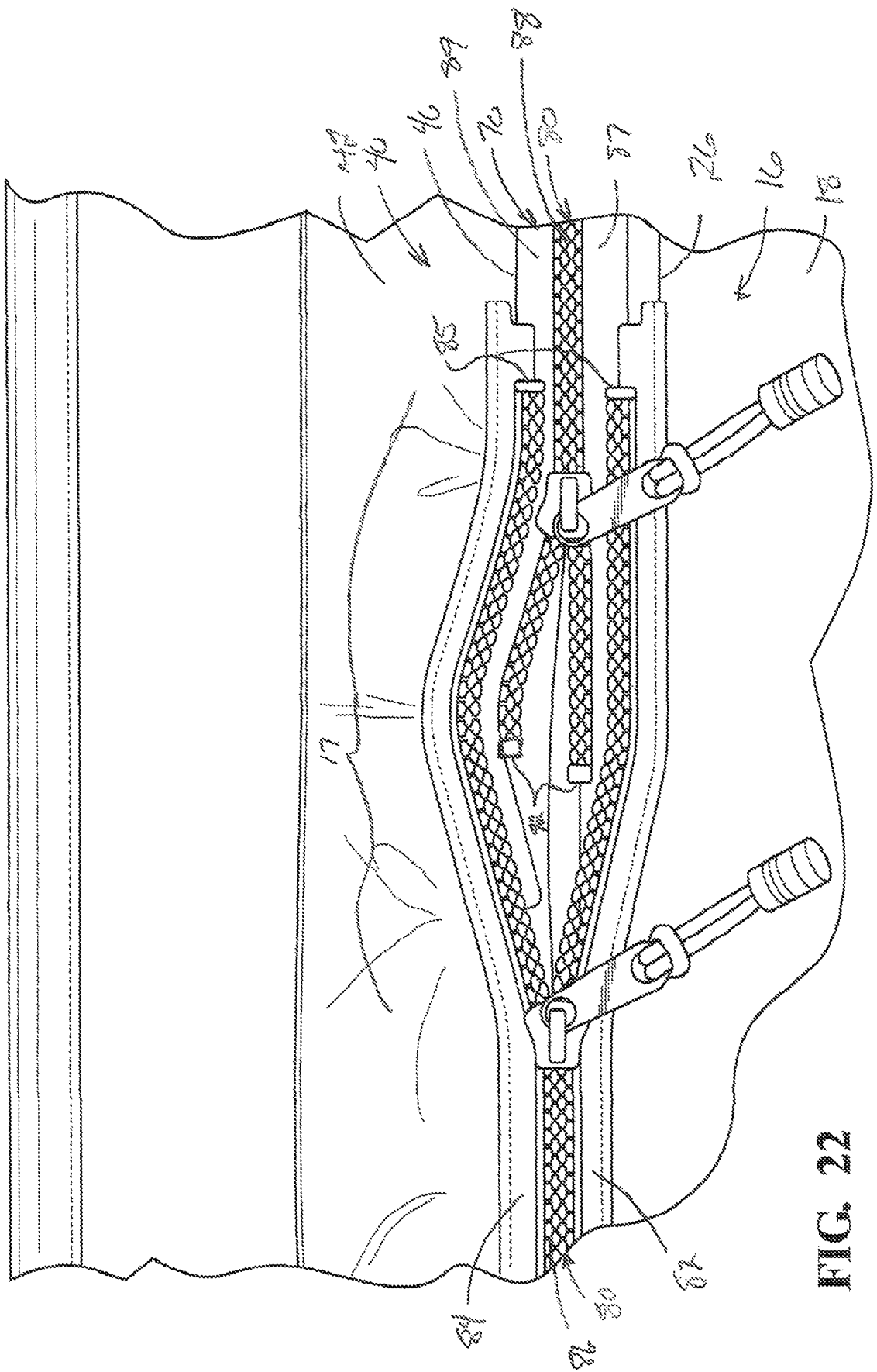
FIG. 22 is an enlarged partial top view of the embodiment of FIG. 12 with the two partially peripherally-extending, centrally overlapping zippers in a partially open/unzipped condition revealing an overlapping configuration of the zippers.

As shown in FIGS. 10 and 21, the bag body 12 also includes a partially peripherally-extending closure 70 configured to selectively attach and release the first open end 26 of the left peripheral wall 16 to the second open end 46 of the right peripheral wall 40. The partially peripherally-extending closure 70 is a selectively openable and closable mechanism that allows the bag body 12 and the motorcycle bag 10 to be selectively opened and closed by a user or operator. The partially peripherally-extending closure 70 extends partially, or around a portion of, the left periphery 18 and the right periphery 42. In one embodiment, the partially peripherally-extending closure 70 extends generally or substantially from a front end 72 to a rear end 74 of the bottom side 68 and upon opening of the bag body 12 allows the left body portion 36 and the right body portion 60 to open to rest on a supporting structure 76, such as the ground, a floor, or a transportation deck 78 of a vehicle or trailer thereby exposing the bottom side 68 and easily allowing the motorcycle 100 to easily be rolled into or rolled out of bottom side 68 of the motorcycle bag 100.

In one embodiment, the partially peripherally-extending, selectively openable and closable closure 70 comprises a partially peripherally-extending zipper 80. The partially peripherally-extending zipper 80 is a water-resistant or waterproof zipper and the left or first zipper portion 82 and right or second zipper portion 84 of the zipper may be attached with any suitable attachment, including, in one embodiment, a stitched seam formed by sewing, and in another embodiment, a welded seam formed by a welding process, such as ultrasonic, RF or thermal welding. Any suitable partially peripherally-extending zipper 80 may be used, including a single zipper (not shown). In one embodiment, the partially peripherally-extending zipper 80 comprises a first zipper 86 and a second zipper 88. The first zipper 80 having a first zipper portion 82 attached to the first open end 26 and a second zipper portion 84 attached to the second open end 46. The first zipper 86 extending from the first zipper stop 81 at a front end 72 of the bottom side 68 toward a first zipper end 85 in a central portion 17 of the left peripheral wall 16 and right peripheral wall 40. The second zipper 88 having a third zipper portion 87 attached to the first open end 26 and a fourth zipper portion 89 attached to the second open end 46. The second zipper 88 extending from a second zipper stop 90 at a rear end 74 of the bottom side 68 toward a second zipper end 92 in the central portion 17 of the left peripheral wall 16 and right peripheral wall 40. In one embodiment the first zipper end 85 of the first zipper 80 overlaps the second zipper end 92 of the second zipper 88 and the first zipper end 85 is disposed either above (FIG. 11) or below (not shown) the second zipper end 92.

In one embodiment, the bottom side 68 of the bag body 12 comprises a motorcycle stand access opening 94 and a selectively openable and closable motorcycle stand access panel 95 configured to cover the motorcycle stand access opening 94. In one embodiment, the selectively openable and closable motorcycle stand access panel 95 comprises a rectangular hinged flap 96 of the bag material 14 permanently attached on one edge 97 to the bottom side 68 and configured to cover the stand access opening 94. In one embodiment, the surface 98 of the other three edges 99 of the selectively openable and closable motorcycle stand access panel facing the bottom side 68 and corresponding edges 101 of the stand access opening each comprise hook faster tapes 102 and/or loop fastener tapes 104 attached thereto. Alternately, the hook faster tapes 102 and/or loop fastener tapes 104 of the selectively openable and closable motorcycle stand access panel 95 may be replaced by a water-resistant or waterproof zipper in the manner described herein as will easily be understood by those of ordinary skill in the art. The selectively openable and closable motorcycle stand access panel 95 can advantageously be opened to allow access and insertion of a motorcycle stand to support the motorcycle 100, at which time, the motorcycle bag 10 may also advantageously be opened to provide access to the motorcycle 100 for service or maintenance. The selectively openable and closable motorcycle stand access panel 95 can advantageously be closed during transport or storage.

As shown in FIGS. 15-22, in one embodiment, a motorcycle bag 10 and bag body 12 as described herein further comprises a plurality of opposed cinching straps 106 attached to the left body portion 36 and the right body portion 60, respectively, at a plurality of attachment points 107 located at attachment ends 110. In one embodiment, the plurality of opposed cinching straps 106 are attached to the left sidewall 30 of the left body portion 36 and the right sidewall 56 of the right body portion 60. Alternately, in another embodiment (not shown) a plurality of the cinching straps 106 are attached to the left peripheral wall 16 of the left body portion 36 and the right peripheral wall 40 of the right body portion 60 in the same manner as described above. The cinching straps 106 attached to the left body portion 36 each comprise a left attachment device 108 disposed on a free end of the cinching straps. The cinching straps 106 disposed on the right body portion 60 each comprise a right attachment device 110 disposed on a free end of the cinching straps. The left attachment devices 108 and the right attachment devices 110 are configured for selectively attachable and detachable engagement with one another and are configured for tensioning when the left attachment devices and right attachment devices are in attached engagement to provide a compressive force urging the attachment points 108 of the left body portion 36 and right body portion 60 toward one another. In one embodiment, the left attachment devices 108 and the right attachment devices 110 comprise male and female, respectively, plastic snap buckles that are configured for mating, interlocking engagement. The cinching straps 106 may be formed from any suitable flexible, tear-resistant material, including various tear-resistant fabrics, particularly various woven polymer fabrics. In one embodiment, the cinching straps 106 may be formed from woven nylon, including the woven nylon commonly referred to as ballistic nylon.

The motorcycle bag 10 and bag body 12 described herein advantageously may prevent the ingress of the elements of the external environment, including dust, dirt, stones, salt, liquid water (e.g. road spray, rain, condensation), snow, ice, road debris, solar (e.g. IR and UV) radiation, animals, and insects in the closed condition (e.g. FIGS. 1-7 and 12-18), thereby protecting the motorcycle 100 enclosed therein. The motorcycle bag 10 and bag body 12 is either water-resistant or waterproof with regard to liquid water depending on the details of the construction. In embodiments where the bag material 14 is water-resistant, the motorcycle bag 10 and bag body 12 are water-resistant. In embodiments where the bag material 14 is waterproof, the motorcycle bag 10 and bag body 12 may be either water-resistant or waterproof depending on the details of the construction. If stitching by sewing is used to attach the elements of the bag body 12 formed from waterproof bag material to one another, the bag body 12 and motorcycle bag 10 are water-resistant. If welding is used to attach the elements of the bag body 12 formed from waterproof bag material to one another and a waterproof zipper or zippers are used, the bag body 12 and motorcycle bag 10 are waterproof.

In one embodiment, motorcycle bag 10 and bag body 12 comprise a storm flap 112 that overlaps the closure 70 and reduces the exposure of the closure to the elements. One of the first open end 26 or the second open end 46 comprises the storm flap 112. The storm flap 112 is configured to extend over and cover the partially peripherally-extending closure 70. The storm flap may have any suitable lateral width. In one embodiment, the width ranges from 1-6 inches, and more particularly 2-4 inches.

In one embodiment, as shown in FIG. 9, the left body portion 36, the right body 60 portion, or both, comprise a bag liner 114 disposed on inward facing surfaces of the respective body portion. The liner 114 may comprise any suitable liner material, including all manner of woven and non-woven fabrics, and including various microfiber and fleece materials.

A method of making 200 a motorcycle bag 100 is also disclosed. The method of making 200 includes forming 202 a bag body 12 of a bag material 14 configured to enclose a motorcycle 100 as described herein. The bag body 12 includes a left peripheral wall configured to enclose the left periphery of a left side of the motorcycle along a longitudinal axis thereof, the left peripheral wall having a first open end and an opposed first closed end; a left sidewall attached by a first attachment to and enclosing the first closed end, the left peripheral wall and left sidewall comprising a left body portion configured to enclose a left side of the motorcycle, the left body portion comprising an outwardly-protruding, flexible, left attachment access port opening into the left sidewall proximate a left side of a motorcycle handlebar; a right peripheral wall opposing the left peripheral wall configured to enclose the right periphery of a right side of the motorcycle along the longitudinal axis thereof, the right peripheral wall having a second open end and an opposed second closed end; a right sidewall attached by a second attachment to and enclosing the second closed end, the right peripheral wall and right sidewall comprising a right body portion, the right body portion comprising an outwardly-protruding, flexible, right attachment access port opening into the right sidewall proximate a right side of the motorcycle handlebar; a joint joining the first open end of the left body portion to the second open end of the right body portion and comprising a bottom side of the bag body; and a partially peripherally-extending, selectively openable and closable closure configured to selectively attach and release the first open end of the left peripheral wall to the second open end of the right peripheral wall.

A method 300 of using a motorcycle bag 100 is also disclosed. The method 300, includes forming 310 a bag body of a bag material configured to enclose a motorcycle, the bag body comprising: a left peripheral wall configured to enclose the periphery of a left side of the motorcycle along a longitudinal axis thereof, the left peripheral wall having a first open end and an opposed first closed end; a left sidewall attached by a first attachment to and enclosing the first closed end, the left peripheral wall and left sidewall comprising a left body portion configured to enclose a left side of the motorcycle, the left body portion comprising an outwardly-protruding, flexible, left attachment access port opening into the left sidewall proximate a left side of a motorcycle handlebar; a right peripheral wall opposing the left sidewall configured to enclose the periphery of a right side of the motorcycle along the longitudinal axis thereof, the right peripheral wall having a second open end and an opposed second closed end; a right sidewall attached by a second attachment to and enclosing the second closed end, the right peripheral wall and right sidewall comprising a right body portion, the right body portion comprising an outwardly-protruding, flexible, right attachment access port opening into the right sidewall proximate a right side of the motorcycle handlebar; a joint joining the first end of the left body portion to the second end of the right body portion and comprising a bottom side of the bag body; and a partially peripherally-extending, selectively openable and closable closure configured to selectively attach and release the first end of the left sidewall to the second end of the right sidewall.

The method of using 300 also includes opening 320 the closure to separate the left body portion and the right body portion as described herein.

The method of using 300 also includes inserting 330 a motorcycle onto the bottom side as described herein.

The method of using 300 also includes closing 340 the partially peripherally-extending, selectively openable and closable closure.

The method of using 300 also includes disposing 350 a pair of conventional selectively attachable/detachable attachment points 116 on a left side and a right side of the motorcycle handlebar as shown in FIGS. 9, 10, 19, and 20.

The method of using 300 also includes detachably attaching 360 the motorcycle to a transportation deck by attaching respective ones of a pair of selectively adjustable tensioning straps to respective ones of the pair of selectively attachable/detachable attachment points as shown in FIGS. 10 and 20.

The terms "a" and "an" herein do not denote a limitation of quantity, but rather denote the presence of at least one of the referenced items. The modifier "about" used in connection with a quantity is inclusive of the stated value and has the meaning dictated by the context (e.g., includes the degree of error associated with measurement of the particular quantity). Furthermore, unless otherwise limited all ranges disclosed herein are inclusive and combinable (e.g., ranges of "up to about 25 weight percent (wt. %), more particularly about 5 wt. % to about 20 wt. % and even more particularly about 10 wt. % to about 15 wt. %" are inclusive of the endpoints and all intermediate values of the ranges, e.g., "about 5 wt. % to about 25 wt. %, about 5 wt. % to about 15 wt. %", etc.). The use of "about" in conjunction with a listing of items is applied to all of the listed items, and in conjunction with a range to both endpoints of the range. Finally, unless defined otherwise, technical and scientific terms used herein have the same meaning as is commonly understood by one of skill in the art to which this invention belongs. The suffix "(s)" as used herein is intended to include both the singular and the plural of the term that it modifies, thereby including one or more of that term (e.g., the metal(s) includes one or more metals). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments.

It is to be understood that the use of "comprising" in conjunction with the components or elements described herein specifically discloses and includes the embodiments that "consist essentially of" the named components (i.e., contain the named components and no other components that significantly adversely affect the basic and novel features disclosed), and embodiments that "consist of" the named components (i.e., contain only the named components).

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A motorcycle bag, comprising:
  a bag body of a bag material configured to enclose a motorcycle, the bag body comprising:
  a left peripheral wall configured to enclose the left periphery of a left side of the motorcycle along a longitudinal axis thereof, the left peripheral wall having a first open end and an opposed first closed end;
  a left sidewall attached by a first attachment to and enclosing the first closed end, the left peripheral wall and left sidewall comprising a left body portion configured to enclose a left side of the motorcycle, the left body portion comprising an outwardly-protruding, flexible, left attachment access port opening into the left sidewall proximate a left side of a motorcycle handlebar;

a right peripheral wall opposing the left peripheral wall configured to enclose the right periphery of a right side of the motorcycle along the longitudinal axis thereof, the right peripheral wall having a second open end and an opposed second closed end;

a right sidewall attached by a second attachment to and enclosing the second closed end, the right peripheral wall and right sidewall comprising a right body portion, the right body portion comprising an outwardly-protruding, flexible, right attachment access port opening into the right sidewall proximate a right side of the motorcycle handlebar, wherein the outwardly-protruding, flexible, left attachment access port and the outwardly-protruding, flexible, right attachment access port each comprise a tube of the bag material;

a joint joining the first open end of the left body portion to the second open end of the right body portion and comprising a bottom side of the bag body; and a partially peripherally-extending, selectively openable and closable closure configured to selectively attach and release the first open end of the left peripheral wall to the second open end of the right peripheral wall.

2. The motorcycle bag of claim 1, wherein the partially peripherally-extending, selectively openable and closable closure comprises a zipper.

3. The motorcycle bag of claim 2, wherein the zipper comprises a first zipper having a first zipper portion attached to the first open end and a second zipper portion attached to the second open end, the first zipper extending from first zipper stop at a front end of the bottom side toward a first zipper end in a central portion of the left peripheral wall and right peripheral wall, and a second zipper having a third zipper portion attached to the first open end and a fourth zipper portion attached to the second open end, the second zipper extending from a second zipper stop at a rear end of the bottom side toward a second zipper end in the central portion of the left peripheral wall and right peripheral wall.

4. The motorcycle bag of claim 3, wherein the first zipper end of the first zipper overlaps the second zipper end of the second zipper and the first zipper end is disposed either above or below the second zipper end.

5. The motorcycle bag of claim 1, wherein the bottom side comprises a motorcycle stand access opening and a selectively openable and closable motorcycle stand access panel configured to cover the motorcycle stand access opening.

6. The motorcycle bag of claim 5, wherein the selectively openable and closable motorcycle stand access panel comprises a rectangular hinged flap of the bag material permanently attached on one edge to the bottom side and having three free edges, wherein the flap is configured to cover the stand access opening.

7. The motorcycle bag of claim 6, wherein the surface of the three free edges of the rectangular hinged flap facing the bottom side and corresponding edges of the stand access opening each comprise hook and/or loop fastener tapes attached thereto.

8. The motorcycle bag of claim 1, further comprising a plurality of opposed cinching straps attached to the left body portion and the right body portion, respectively, at a plurality of attachment points located at attachment ends, the cinching straps disposed on the left body portion each comprising a left attachment device disposed on a free end of the cinching straps, the cinching straps disposed on the right body portion each comprising a right attachment device disposed on a free end of the cinching straps, the left attachment devices and the right attachment devices configured for selectively attachable and detachable engagement with one another, the cinching straps configured for tensioning when the left attachment devices and right attachment devices are in attached engagement to provide a compressive force urging the attachment points of the left and right body portions toward one another.

9. The motorcycle bag of claim 1, wherein the bag material comprises a polymer sheet or a fabric.

10. The motorcycle bag of claim 9, wherein the fabric bag material comprises a polymer-coated fabric.

11. The motorcycle bag of claim 10, wherein the polymer-coated fabric comprises polyvinyl chloride (PVC) coated polyester fabric.

12. The motorcycle bag of claim 9, wherein the polymer sheet comprises a polyurethane sheet.

13. The motorcycle bag of claim 1, wherein the motorcycle bag is water-resistant or waterproof.

14. The motorcycle bag of claim 1, wherein one of the first open end or the second open end comprises a storm flap that extends over and covers the partially peripherally-extending closure.

15. The motorcycle bag of claim 1, wherein the first attachment and the second attachment comprise a stitched seam or a welded seam.

16. The motorcycle bag of claim 1, wherein the left body portion, the right body portion, or both, comprise a bag liner disposed on the inward facing surfaces.

17. The motorcycle bag of claim 1, wherein the bag liner comprises a woven or non-woven fabric.

18. A method of making a motorcycle bag, comprising:
forming a bag body of a bag material configured to enclose a motorcycle, the bag body comprising:

a left peripheral wall configured to enclose the left periphery of a left side of the motorcycle along a longitudinal axis thereof, the left peripheral wall having a first open end and an opposed first closed end;

a left sidewall attached by a first attachment to and enclosing the first closed end, the left peripheral wall and left sidewall comprising a left body portion configured to enclose a left side of the motorcycle, the left body portion comprising an outwardly-protruding, flexible, left attachment access port opening into the left sidewall proximate a left side of a motorcycle handlebar;

a right peripheral wall opposing the left peripheral wall configured to enclose the right periphery of a right side of the motorcycle along the longitudinal axis thereof, the right peripheral wall having a second open end and an opposed second closed end;

a right sidewall attached by a second attachment to and enclosing the second closed end, the right peripheral wall and right sidewall comprising a right body portion, the right body portion comprising an outwardly-protruding, flexible, right attachment access port opening into the right sidewall proximate a right side of the motorcycle handlebar, wherein the outwardly-protruding, flexible, left attachment access port and the outwardly-protruding, flexible, right attachment access port each comprise a tube of the bag material;

a joint joining the first open end of the left body portion to the second open end of the right body portion and comprising a bottom side of the bag body; and a partially peripherally-extending, selectively openable and closable closure configured to selectively attach and release the first open end of the left peripheral wall to the second open end of the right peripheral wall.

19. A method of using a motorcycle bag, comprising:
forming a bag body of a bag material configured to enclose a motorcycle, the bag body comprising: a left peripheral wall configured to enclose the left periphery of a left side of the motorcycle along a longitudinal axis thereof, the left peripheral wall having a first open end and an opposed first closed end; a left sidewall attached by a first attachment to and enclosing the first closed end, the left peripheral wall and left sidewall comprising a left body portion configured to enclose a left side of the motorcycle, the left body portion comprising an outwardly-protruding, flexible, left attachment access port opening into the left sidewall proximate a left side of a motorcycle handlebar; a right peripheral wall opposing the left peripheral wall configured to enclose the right periphery of a right side of the motorcycle along the longitudinal axis thereof, the right peripheral wall having a second open end and an opposed second closed end; a right sidewall attached by a second attachment to and enclosing the second closed end, the right peripheral wall and right sidewall comprising a right body portion, the right body portion comprising an outwardly-protruding, flexible, right attachment access port opening into the right sidewall proximate a right side of the motorcycle handlebar, wherein the outwardly-protruding, flexible, left attachment access port and the outwardly-protruding, flexible, right attachment access port each comprise a tube of the bag material; a joint joining the first open end of the left body portion to the second open end of the right body portion and comprising a bottom side of the bag body; and a partially peripherally-extending, selectively openable and closable closure configured to selectively attach and release the first open end of the left peripheral wall to the second open end of the right peripheral wall;

opening the partially peripherally-extending, selectively openable and closable closure to separate the left body portion and the right body portion;

inserting a motorcycle onto the bottom side; and closing the partially peripherally-extending, selectively openable and closable closure.

20. The method of claim 19, further comprising:
disposing a pair of selectively attachable/detachable attachment points on a left side and a right side of the motorcycle handlebar; and detachably attaching the motorcycle to a transportation deck by attaching respective ones of a pair of selectively adjustable tensioning straps to respective ones of the pair of selectively attachable/detachable attachment points.

* * * * *